United States Patent
Nogi et al.

(10) Patent No.: US 9,051,067 B2
(45) Date of Patent: Jun. 9, 2015

(54) METHOD FOR PRODUCING PARTICULATE WATER-ABSORBING AGENT COMPOSED PRINCIPALLY OF WATER-ABSORBING RESIN

(75) Inventors: Kozo Nogi, Himeji (JP); Sumio Okuda, Himeji (JP); Keiji Inoue, Himeji (JP); Kazumasa Konishi, Himeji (JP); Toru Nishioka, Himeji (JP); Yusuke Watanabe, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 52 days.

(21) Appl. No.: 12/921,877

(22) PCT Filed: Mar. 13, 2009

(86) PCT No.: PCT/JP2009/054914
§ 371 (c)(1),
(2), (4) Date: Sep. 10, 2010

(87) PCT Pub. No.: WO2009/113679
PCT Pub. Date: Sep. 17, 2009

(65) Prior Publication Data
US 2011/0015351 A1 Jan. 20, 2011

(30) Foreign Application Priority Data

Mar. 13, 2008 (JP) ................................. 2008-064408
Mar. 28, 2008 (JP) ................................. 2008-088072
Apr. 25, 2008 (JP) ................................. 2008-115446
Apr. 25, 2008 (JP) ................................. 2008-115751
Jul. 18, 2008 (JP) ................................. 2008-187904
Sep. 18, 2008 (JP) ................................. 2008-238918

(51) Int. Cl.
| | |
|---|---|
| C08J 3/24 | (2006.01) |
| C08F 20/06 | (2006.01) |
| B65B 1/08 | (2006.01) |
| B01J 20/26 | (2006.01) |
| B65B 37/04 | (2006.01) |
| B65B 1/06 | (2006.01) |
| B65B 1/22 | (2006.01) |
| B01J 20/30 | (2006.01) |

(52) U.S. Cl.
CPC . B65B 1/08 (2013.01); C08J 3/245 (2013.01); C08F 20/06 (2013.01); B01J 20/267 (2013.01); B65B 37/04 (2013.01); B65B 1/06 (2013.01); B65B 1/22 (2013.01); B01J 20/26 (2013.01); B01J 20/30 (2013.01)

(58) Field of Classification Search
CPC .......... C08F 20/06; C08J 3/245; B01J 20/26; B01J 20/30; B01J 20/267; B65B 1/06; B65B 1/08; B65B 1/22; B65B 37/04

USPC ............................................. 525/329.7, 330.1
See application file for complete search history.

(56) References Cited

U.S. PATENT DOCUMENTS

| | | | |
|---|---|---|---|
| 4,950,692 A | 8/1990 | Lewis et al. | |
| 4,970,267 A | 11/1990 | Bailey et al. | |
| 4,983,434 A * | 1/1991 | Sassa | 428/36.2 |
| 5,234,739 A * | 8/1993 | Tanaru et al. | 428/131 |
| 5,342,899 A | 8/1994 | Graham et al. | |
| 6,458,921 B1 | 10/2002 | Dairoku et al. | |
| 7,378,453 B2 | 5/2008 | Nogi et al. | |
| 2001/0011123 A1* | 8/2001 | Kakita et al. | 528/503 |
| 2004/0181031 A1* | 9/2004 | Nogi et al. | 528/480 |
| 2006/0247351 A1* | 11/2006 | Torii et al. | 524/406 |
| 2007/0232760 A1* | 10/2007 | Fujimaru et al. | 525/329.7 |
| 2010/0249320 A1* | 9/2010 | Matsumoto et al. | 524/832 |

FOREIGN PATENT DOCUMENTS

| | | |
|---|---|---|
| EP | 1116510 A1 | 7/2001 |
| JP | 6-154298 | 6/1994 |
| JP | 7-241462 | 9/1995 |
| JP | 11-70307 | 3/1999 |
| JP | 11-106514 | 4/1999 |
| JP | 2000-061224 | 2/2000 |
| JP | 2001-79829 | 3/2001 |
| JP | A-2001-219015 | 8/2001 |
| JP | 2004-300425 | 10/2004 |
| JP | 2004-352776 | 12/2004 |
| JP | 2005-97604 | 4/2005 |
| JP | A-2007-256563 | 10/2007 |
| WO | WO-00/46492 | 8/2000 |
| WO | WO 2008/015946 A1 * | 2/2008 |
| WO | WO 2009/028568 A1 * | 3/2009 |

* cited by examiner

Primary Examiner — Roberto Rabago
(74) Attorney, Agent, or Firm — Cesari and McKenna, LLP

(57) ABSTRACT

Provided is a production method for the particulate water-absorbing agent, which can collecting the fine powders generated during the producing process efficiently without worsening working environment, and also the particulate water-absorbing agent produced by the production method thereof. This production method includes (1) a polymerization step for obtaining a polymer gel, (2) a drying step for drying said polymer gel to obtain a particulate water-absorbing resin, (3) a classification step for sieving said particulate water-absorbing resin, (4) a surface cross-linking step for cross-linking the neighborhood of the surface of said particulate water-absorbing resin (5) a packaging step for filling a packaging material container with said particulate water-absorbing agent for packaging and (6) a transportation step for transporting the products produced in each of the steps to the other steps. In this production method, the fine powders contained in gas composed principally of air, in any of the steps, can be collected by use of a trapping material.

16 Claims, 6 Drawing Sheets

1
METHOD FOR PRODUCING PARTICULATE WATER-ABSORBING AGENT COMPOSED PRINCIPALLY OF WATER-ABSORBING RESIN

CROSS REFERENCE TO RELATED APPLICATIONS

This application is a National Stage of International Application No. PCT/JP2009/054914, filed on Mar. 13, 2009, which claims the priority Japanese Application No. 2008-064408 filed Mar. 13, 2008, Japanese Application No. 2008-088072 filed Mar. 28, 2008, Japanese Application No. 2008-115446 filed Apr. 25, 2008, Japanese Application No. 2008-115751 filed Apr. 25, 2008, Japanese Application No. 2008-187904 filed Jul. 18, 2008, and Japanese Application No. 2008-238918 filed Sep. 18, 2008. The content of the prior application mentio0ned above is incorporated by reference in its entirety.

BACKGROUND OF THE INVENTION

1. Technical Field

The present invention relates to a method for producing a particulate water-absorbing agent composed principally of a water-absorbing resin. For detail, the present invention relates to the method for producing the particulate water-absorbing agent, which can produce the particulate water-absorbing agent, while collecting fine powders generating in a production process. For more detail, the present invention relates to the method for producing the particulate water-absorbing agent by use of a membrane filter, which can suppress penetration of the fine powders into the inside of a filter to be used in trapping the fine powders generating in the production process, collect the fine powders efficiently, and further easily shake off the fine powders attached onto the filter by physical impact.

2. Background Art

In recent years, in hygiene products such as disposable diapers, sanitary napkins and incontinent pads, the water-absorbing resin as a composition material thereof has been widely used, as a water-absorbent agent, in view of absorbing a body liquid. As such a water-absorbing resin, for example, there have been known a cross-linked product of partially neutralized polyacrylic acid, a hydrolysate of a starch-acrylic acid graft polymer, a saponified product of a vinyl acetate-acrylate ester copolymer, a hydrolysate of an acrylonitrile copolymer or an acrylamide copolymer and a cross-linked product thereof, and a cross-linked product of a cationic monomer and the like. This water-absorbing resin may be used after converted to also a sheet-like, fiber-like or film-like form, however, it is generally used in a water-absorbing agent after converted to a powder-like form (particulate). As such powders (particles), for example, the particulate water-absorbing agent, having a weight average particle diameter thereof of about 200 to 800 μm, is used widely. The particulate water-absorbing agent is produced via many steps. These steps may include the polymerization step, the drying step, the pulverization step, the classification step, the surface cross-linking step, and the like.

In producing the particulate water-absorbing agent, formation of the fine powders (for example, the fine powders with a particle diameter of below 150 μm) of the water-absorbing resin is accompanied. If the fine powders are contained in disposable diapers and the like, they clog absorbent articles composed of the particulate water-absorbing agent, which causes decrease in liquid permeability of the absorbent articles. In addition, the fine powders influence surface cross-linking effect of the particulate water-absorbing agent, and even if surface cross-linking is performed to the particulate water-absorbing agent containing the fine powders, there can be the case where various properties such as liquid permeability, absorbency against pressure are not enhanced sufficiently.

Amount of the fine powders generating in producing the particulate water-absorbing agent can become several % by weight to ten and several % by weight, and in certain cases, as many as several tens % by weight of solid content of the polymer gel obtained in the polymerization step, that is, a dry substance or a dried pulverized substance. Because disposal of the fine powders accompanies generation of disposal cost of the fine powders in addition to decrease in yield of the particulate water-absorbing agent, it incurs increase in production cost of the particulate water-absorbing agent. Because the fine powders are inferior in properties, it is difficult to utilize the fine powders to other applications without disposal. Because demand for the fine powders is generally low, it is also difficult to sell the fine powders.

The fine powders generating in producing the particulate water-absorbing agent accompanies formation of two kinds of the fine powders 1 and the fine powders 2 (hereafter, when describing "the fine powders", it is to a generic name of the fine powders 1 and the fine powders 2). The fine powders 1 indicate fine powders generating at and after the step for adding additives (an addition step) in order to enhance performance of the particulate water-absorbing agent in a production process of the particulate water-absorbing agent, and the fine powders 2 indicate fine powders generating in a production process before the addition step. Therefore, the fine powders 1 contain more fine powders derived from the additives, as compared with the fine powders 2. Up to now, a filter, made of only fiber such as nonwoven fabric, has been used frequently, in trapping the fine powders in the production step of the particulate water-absorbing agent, however, when said filter was used, there remained enough improvable in trapping efficiency of the fine powders 1. And, there also remains improvable in the problem of gradual decrease over time in trapping efficiency caused by intrusion of the fine powders 1 into the inside of the filter. In addition, there also remained improvable in a work environment aspect, that is, the fine powders 1 intruded into the inside penetrate through the filter finally and are discharged to the outside of a system, thereby deteriorating work environment. Further, it was also insufficient to completely shake off the fine powders even by adding operation of shaking off the fine powders attached onto the filter, specifically physical (mechanical) impact (such as wave pulse of air). As a result, clogging of the filter generates, which requires filter exchange, and is thus inefficient. Further, there can also generate deterioration of work environment caused by scattering of the fine powders in the exchange.

Accordingly, as a method for obtaining a cheap particulate water-absorbing agent containing less fine powders, many methods for reusing the fine powders, that is, recycling methods for the fine powders have been proposed. As the recycling methods for the fine powders, there are (I) a method for mixing the fine powders as they are into an aqueous solution containing a monomer before polymerization to polymerize (refer to Patent Document 1), (II) a method for mixing the fine powders as they are into a gel in the way of polymerization to polymerize (refer to Patent Documents 2 and 3), (III) a method for mixing the fine powders as they are into a polymer gel obtained by polymerization, (IV) a method for mixing a large particle obtained by granulating the fine powders in aqueous liquid into a polymer gel obtained by polymerization (refer to Patent Document 4) and the like. Among these, in the methods (I) to (III), the fine powders are used as they are. In these methods, uniform mixing of the fine powders is difficult, and further the fine powders absorb a monomer, water or the like and thus could decrease performance thereof. From this view point, a method (IV) is considered preferable, which utilizes granulated particles composed of a plurality of the fine powders. In the method (IV), the granulated particles (secondary particles) as large particles are formed by binding the fine powders (single particles) themselves generally by use of water as a binder. Because the aqueous liquid as water is contained in the granulated particles, it is necessary to dry the granulated particles. In addition, as an application of the method (IV), it is also considered a method for making particles by pulverizing the granulated gels (tertiary particles) obtained by further aggregating the granulated particles themselves composed of a plurality of the fine powders. However, this method results in containing a large quantity of water by the granulated gel, and therefore consumes a large quantity of energy for drying the granulated gel. Such a method cannot be said to be a preferable method due to increase in production cost.

The production method for the particulate water-absorbing agent usually includes the step for cross-linking the neighborhood of the surface of the water-absorbing resin by adding a surface cross-linking agent to the water-absorbing resin and heating. This step also includes the step for cooling the particulate water-absorbing agent thus heated. In this cooling step, there may be the case where a method for removing the fine powders of the water-absorbing resin and/or a part of the remaining surface cross-linking agent, while cooling the particulate water-absorbing agent thus heated by the air generated by reduced pressure (refer to Patent Document 5). In this method, surface cross-linking is performed in a state that the fine powders generated in the step before this step are contained as they are. Therefore, the remaining fine powders cannot be removed, and thus there is a problem that the remaining fine powders deteriorate work environment. Because the fine powders deteriorate mixing property of the water-absorbing resin with the surface cross-linking agent, there is also a problem that the neighborhood of the surface of the water-absorbing resin is not cross-linked sufficiently. Further, action of a part of the surface cross-linking agent makes granulation of the remaining fine powders, and the fine powders granulated are crushed in the subsequent steps or in producing an water-absorbing material (for example, in producing absorbent articles such as disposable diapers and the like), and the fine powders thus crushed float as dust, and thus there are also worry about causing a problem of deterioration of work environment, and a problem that the fine powders thus crushed obstruct performance (for example, liquid permeability) of the absorbent articles.

In addition, with enhancement of performance of the particulate water-absorbing agent, enhancement of properties of the water-absorbing resin, such as absorbency against non-pressure (CRC), absorbency against pressure (AAP) and saline flow conductivity (SFC) to be described later, has been required. In order to respond to this request, a firm surface cross-link structure is introduced to the surface of the water-absorbing resin, or many additives (for example, water-insoluble fine particle and the like) are used. However, such steps take a long time process in many cases. Therefore, the water-absorbing resin particles are destroyed to incur by-production of the fine powders. That is, requiring of high property to the water-absorbing resin results in increasing the fine powders in the water-absorbing agent obtained.

PRIOR DOCUMENTS

Patent Documents

Patent Document 1: U.S. Pat. No. 5,342,899
Patent Document 2: U.S. Pat. No. 4,970,267
Patent Document 3: U.S. Pat. No. 4,950,692
Patent Document 4: U.S. Pat. No. 6,458,921
Patent Document 5: USP-A-2004/0181031

DISCLOSURE OF THE INVENTION

Problem to be Solved by the Invention

The methods described in the above publications have attained recycling of the fine powders, and however, it is a present state that removal of the fine powders contained in the particulate water-absorbing agent is not yet sufficient. Because of insufficient removal of the fine powders, there is a problem that various properties, such as liquid permeability, absorbency against pressure, or the like of the particulate water-absorbing agent cannot be enhanced sufficiently.

The fine powders tend to scatter during incorporation of the particulate water-absorbing agent in absorbent articles such as disposable diapers. In this case, the fine powders not only influence productivity but also float in work environment as powder dust. Therefore, scattering of the fine powders incurs deterioration of work environment.

When a filter, composed of only fiber such as nonwoven fabric or the like, is used, the fine powders intrude inside the filter in collecting the fine powders. In particular, in the case of the fine powders 1 containing a large quantity of additives, amount of the fine powders intruding inside the filter is large, and in some cases the fine powders penetrate through the filter and are discharged to the outside of a system. In addition, because the fine powders attached onto the filter are not shaken off even by adding physical impact (wave pulse of air or the like) in shaking them off, trapping efficiency of the filter gradually decreases. As a result, filter exchange is required every time, and is thus inefficient. Further, there also generates deterioration of work environment could also be caused by scattering of the fine powders in the exchange of the filter.

Therefore it is an object of the present invention to provide the method for producing the particulate water-absorbing agent with less fine powders, and the particulate water-absorbing agent produced by the production method thereof.

Means for Solving the Problem

The present inventors have intensively studied a way to solve the problems. As a result, the present inventors have found that in the method for producing the particulate water-absorbing agent composed principally of the water-absorbing resin, by collecting the fine powders scattering in any of the steps or between each of the steps by use of a trapping material such as a filter, membrane filter, or the like, the fine powders can be collected efficiently, while deterioration of work environment caused by scattering of the fine powders can be prevented, and thus the particulate water-absorbing agent having less fine powders can be obtained. The present invention has thus been completed, based on this knowledge.

That is, the method for producing the particulate water-absorbing agent relevant to the present invention includes:
(1) a polymerization step for obtaining a polymer gel;
(2) a drying step for drying said polymer gel to obtain a particulate water-absorbing resin;

(3) a classification step for sieving said particulate water-absorbing resin;
(4) a surface cross-linking step for cross-linking the neighborhood of the surface of the particulate water-absorbing resin obtained in the classification step to obtain a particulate water-absorbing agent;
(5) a packaging step for filling a packaging material container with said particulate water-absorbing agent for packaging; and
(6) a transportation step for transporting the products produced in each of the steps to the other steps.

In this production method, fine powders contained in gas composed principally of air, in any of the steps, can be collected by use of the trapping material.

Preferably, the fine powders can be collected in at least one step at and after the drying step of the (2). Particularly preferably, the fine powders can be collected in at least one step at and after the classification step of the (3).

Another method for producing the particulate water-absorbing agent relevant to the present invention includes:
(1) a polymerization step for obtaining a polymer gel;
(2) a drying step for drying said polymer gel to obtain a particulate water-absorbing resin;
(3) a pulverization step for pulverizing said particulate water-absorbing resin;
(4) a classification step for sieving the particulate water-absorbing resin obtained in the pulverization step;
(5) a surface cross-linking step for cross-linking the neighborhood of the surface of the particulate water-absorbing resin obtained in the classification step to obtain a particulate water-absorbing agent;
(6) a packaging step for filling a packaging material container with said particulate water-absorbing agent for packaging; and
(7) a transportation step for transporting the products produced in each of the steps to the other steps.

In this production method, the fine powders contained in gas composed principally of air, in any of the steps, can be collected by use of a trapping material.

Preferably, the fine powders can be collected in at least one step at and after the drying step of the (2). Particularly preferably, the fine powders can be collected in at least one step at and after the classification step of the (3).

Still another method for producing the particulate water-absorbing agent relevant to the present invention includes:
(1) a polymerization step for obtaining a polymer gel;
(2) a drying step for drying said polymer gel to obtain a particulate water-absorbing resin;
(3) a pulverization step for pulverizing said particulate water-absorbing resin;
(4) a classification step for sieving the particulate water-absorbing resin obtained in the pulverization step;
(5) a surface cross-linking step for cross-linking the neighborhood of the surface of the particulate water-absorbing resin obtained in the classification step to obtain a particulate water-absorbing agent;
(6) a cooling step for cooling said particulate water-absorbing agent;
(7) a granule sizing step for sizing the particulate water-absorbing agent obtained in the cooling step;
(8) a packaging step for filling a packaging material container with the particulate water-absorbing agent obtained in the granule sizing step for packaging; and
(9) a transportation step for transporting the products produced in each of the steps to the other steps.

In this production method, the fine powders contained in gas composed principally of air, in any of the steps, can be collected by use of a trapping material.

Preferably, the fine powders can be collected in at least one step at and after the drying step of the (2). Particularly preferably, the fine powders can be collected in at least one step at and after the classification step of the (3).

Still another method for producing the particulate water-absorbing agent relevant to the present invention includes:
(1) a polymerization step for obtaining a polymer gel;
(2) a drying step for drying said polymer gel to obtain a particulate water-absorbing resin;
(3) a pulverization step for pulverizing said particulate water-absorbing resin;
(4) a classification step for sieving the particulate water-absorbing resin obtained in the pulverization step;
(5) a surface cross-linking step for cross-linking the neighborhood of the surface of the particulate water-absorbing resin obtained in the classification step to obtain a particulate water-absorbing agent;
(6) a granule sizing step for sizing said particulate water-absorbing agent;
(7) a packaging step for filling a packaging material container with the particulate water-absorbing agent obtained in the granule sizing step for packaging;
(8) a transportation step for transporting the products produced in each of the steps to the other steps;
(9) a collection step for collecting fine powders contained in gas composed principally of air, in any of the steps, by use of a trapping material; and
(10) a granulation step for granulating the fine powders collected by use of the trapping material, the fine powders classified by the classification step, and the fine powders sized by the granule sizing step, to obtain granulated particles.

In this production method, the granulated particles can be charged to any of the steps other than the granulation step.

Preferably, the fine powders can be collected in at least one step at and after the drying step of the (2). Particularly preferably, the fine powders can be collected in at least one step at and after the classification step of the (3).

Preferably, in the present production method, the trapping material is provided in a fine powder capturing apparatus in at least one of the steps. The number of a fine powder capturing apparatus is not especially limited. For example, one fine powder capturing apparatus is installed and the fine powders generating at each step may be collected all together. Alternatively, a plurality of fine powders capturing apparatuses are installed, and the fine powders generating at each step may be collected. In this case, one fine powder capturing apparatus may be installed by each step for collecting the fine powders, or the steps for collecting the fine powders may be divided to several groups to install the fine powder capturing apparatus by each of the groups. Because the more is the number of fine powder capturing apparatus installed, trapping efficiency becomes the higher, the number of the fine powder capturing apparatus may be at least two or more in total, preferably three or more, and further preferably five or more. However, in consideration of economic efficiency or the like, the upper limit of the number of the fine powder capturing apparatus is preferably equal to or less than 20, and more preferably equal to or less than 10.

Preferably, in the present production method, the trapping material is heated to a temperature of equal to or higher than 35° C.

Preferably, in the present production method, the trapping material is a membrane filter, composed of a membrane which can capture the fine powders generating from any of the steps at the surface thereof and a substrate which can support the membrane.

Preferably, in the present production method, the membrane is made of polytetrafluoroethylene.

Preferably, in the present production method, the fine powders contain those generated in the classification step and/or the pulverization step.

Preferably, in the present production method, the fine powders attached onto the membrane filter are shaken off by physical impact.

Preferably, in the present production method, the particle diameter of the fine powders is below 150 μm.

Preferably, in the present production method, gas having a dew point temperature of from −80° C. to −15° C. is passed in any of the steps.

Preferably, in the present production method, pressure is reduced to below atmospheric pressure in any of the steps.

Preferably, in the present production method, pressure is increased over atmospheric pressure in any of the steps.

Preferably, in the present production method, the particulate water-absorbing agent contains at least one kind of a polyvalent metal salt, an inorganic particle, and a liquid permeability improver.

Preferably, in the present production method, the production amount of the particulate water-absorbing agent is equal to or more than 500 kg/h and continuous operation is available.

Preferably, in the present production method, said particulate water-absorbing resin is an irregular pulverized shaped particle of a polyacrylic acid (salt)-based water-absorbing resin.

Preferably, in the present production method, the polymerization step is performed by continuous kneader polymerization or continuous belt polymerization.

Preferably, in the present production method, the surface cross-linking step is performed using a surface cross-linking agent having dehydration esterification reactivity of one or more kinds selected from a group consisting of an oxazolidinone compound, an alkylene carbonate compound, a polyvalent alcohol compound, and an oxetane compound, at a temperature in the range of 150 to 250° C.

Preferably, in the present production method, absorbency against non-pressure (CRC) of the particulate water-absorbing agent is 10 to 100 g/g, absorbency against pressure (AAP) thereof is 15 to 50 g/g, saline flow conductivity (SFC) thereof is equal to or higher than 1 (unit: $10^{-7} \cdot cm^3 \cdot s \cdot g^{-1}$), and content of fine powders with a weight average particle diameter of below 150 μm, contained in the particulate water-absorbing agent, is 0 to 5% by weight relative to the total mass of the particulate water-absorbing agent.

Preferably, in the present production method, the amount of dust (AD) of said particulate water-absorbing agent is equal to or lower than 300 ppm.

Preferably, in this production method, the fine powders collected by the trapping material are recycled. This method for producing the particulate water-absorbing agent is not limited to a range disclosed in the present invention. One example of the method for producing the particulate water-absorbing agent of the present invention is the production method described herein.

Advantages of the Invention

According to the present invention, the fine powders generating in a production process may be collected efficiently, while preventing the scattering thereof. That is, in the method for producing the particulate water-absorbing agent composed principally of the water-absorbing resin of the present invention, not only good work environment can be maintained but also reduction of amount of the fine powders contained in the particulate water-absorbing agent can be attained. As a result, the particulate water-absorbing agent obtained by this production method is superior in various properties, such as liquid permeability, absorbency against pressure, or the like. In addition, because this production method is superior in trapping efficiency of the fine powders, by effective reuse of the fine powders thus collected, effect on production cost, that is, reuse of the fine powders, can be obtained as well.

BEST MODE FOR CARRYING OUT THE INVENTION

Figure 1:
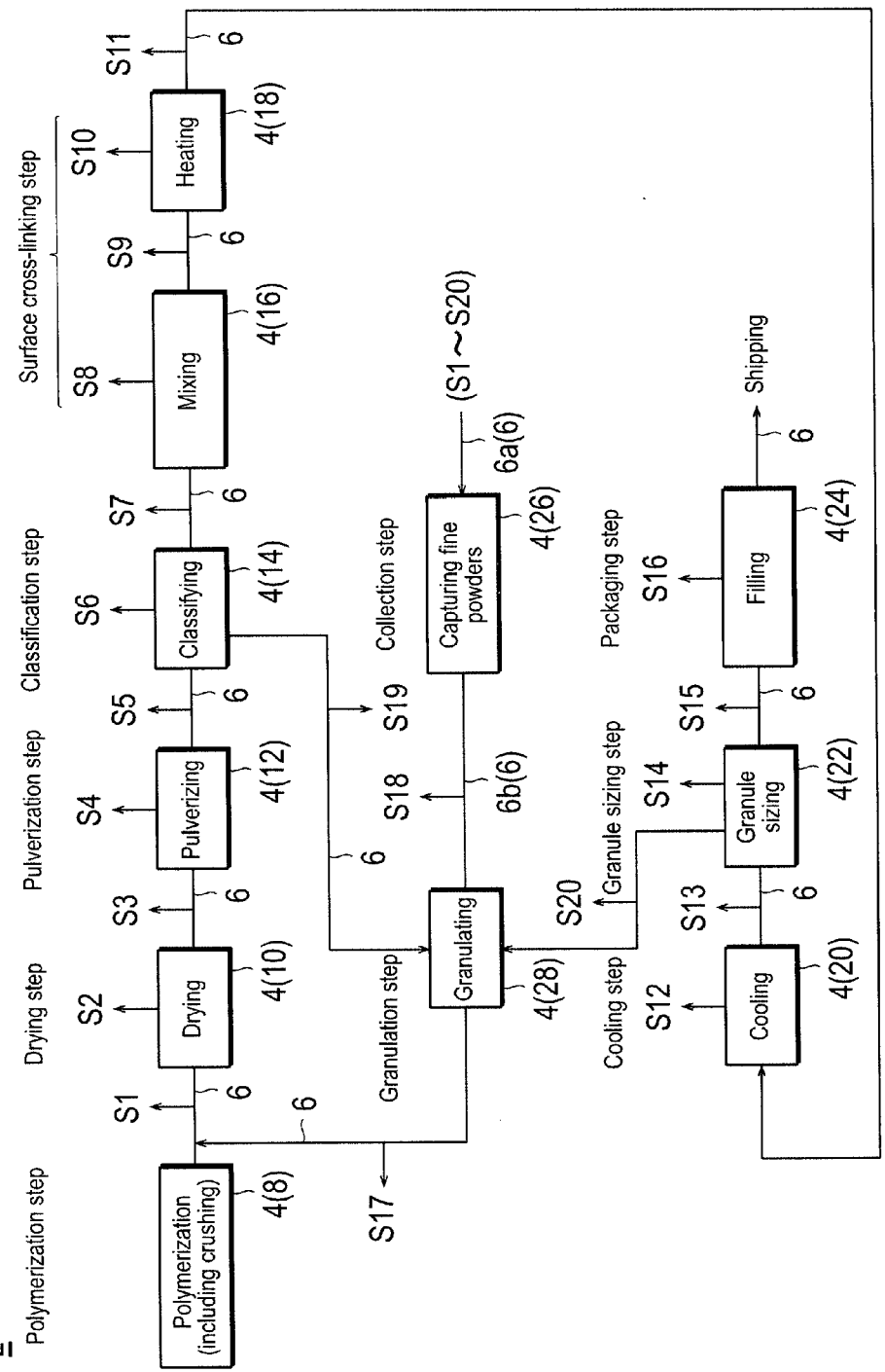
FIG. 1 is a schematic configuration drawing showing a production apparatus to be used to produce the particulate water-absorbing agent.

Explanations will be given below in detail on the method for producing the particulate water-absorbing agent composed principally of the water-absorbing resin relevant to the present invention. However, scope of the present invention should not be restricted to these explanations, and embodiments other than the following exemplifications may be performed by appropriate changes within a range not to deviate from the content of the present invention.

(1) Definition of Terms (a) "The Water-Absorbing Resin"

In the present description, "the water-absorbing resin" means a water swelling and water insoluble polymer gelling agent, and one having the following properties. That is, it means a polymer gelling agent having an absorbency (CRC/specified in Example) of essentially equal to or higher than 5 g/g, preferably 10 to 100 g/g, and further preferably 20 to 80 g/g, and in addition, extractables (specified in ERT450.2-02 (2002)) of essentially 0 to 50% by weight, preferably 0 to 30% by weight, further preferably 0 to 20% by weight, and particularly preferably 0 to 10% by weight. It should be noted that, this water-absorbing resin is not limited to a form where whole amount (100%) is a polymer, and may include additives and the like to be described later, in a range to maintain the performance.

(b) "Polyacrylic Acid (Salt)"

In the present description, "polyacrylic acid (salt)" means a polymer composed principally of acrylic acid (salt) as a repeating unit. Specifically, it means a polymer containing acrylic acid (salt) essentially in 50 to 100% by mole, preferably 70 to 100% by mole, further preferably 90 to 100% by mole, particularly preferably substantially 100% by mole, as a monomer excluding a cross-linking agent. The salt as the polymer contains essentially a water-soluble salt, and is preferably a monovalent salt, and further preferably an alkali metal salt or an ammonium salt. Among them, the alkali metal salt is particularly preferable, and further a sodium salt is preferable.

(c) "The Water-Absorbing Agent"

In the present description, "the water-absorbing agent" means a gelling agent of aqueous liquid, composed principally of the water-absorbing resin. It should be noted that, the aqueous liquid is not limited to water, and may be urine, blood, feces, waste liquid, moisture or steam, ice, a mixture of water and organic solvent and/or inorganic solvent, rain water, underground water or the like, and not especially limited as long as it contains water. Among them, as the aqueous liquid, more preferably urine, in particular human urine is included. Content of the water-absorbing resin (polyacrylic acid (salt)-based water-absorbing resin) relevant to the present invention is preferably 70 to 99.9% by weight, more preferably 80 to 99.7% by weight, and further preferably 90 to 99.5% by weight relative to total amount. As components other than the water-absorbing resin, in view of water absorbing speed or impact resistance of powders (particles), water is preferable and the additives to be described later are contained, as needed.

(d) "EDANA" and "ERT"

"EDANA" is an abbreviation of European Disposables and Nonwovens Association, and "ERT" is an abbreviation of the measurement method (ERT/EDANA Recommended Test Methods) for the water-absorbing resin of an European standard (nearly a world standard). In the present description, unless otherwise specified, the ERT original (known document: revised in 2002) is referred to in measuring properties of the water-absorbing resin.

(e) "The Particle"

In the present description, "the particle" means a solid having fluidity of a particle diameter of equal to or smaller than 5 mm, specified by sieve classification. Water content is not especially limited as long as it is a solid, but, usually it is below 30% by weight, and further preferably equal to or less than 20% by weight. In addition, the lower limit of the particle diameter is, for example, 1 nm. Further, it may be enough to have a certain fluidity as powders, and for example, it means a solid whose Flow Rate (ERT450.2-02) can be measured, or a solid which can be sieve classified by (ERT420.2-02). Shape of the solid is not especially limited, and includes irregular pulverized shaped particles, spherical-shape, nearly spherical-shape, or a granulated substance (aggregated substance) thereof. However, preferably irregular pulverized shaped particles are included.

It should be noted that, in the present description, "X to Y" showing a range indicates to be equal to or higher than X and equal to or lower than Y. In addition, "ton (t)" as a unit of mass means "Metric Ton".

(2) The method for producing the particulate water-absorbing Agent

The method for producing the particulate water-absorbing agent composed principally of the water-absorbing resin relevant to one embodiment of the present invention includes (1) a polymerization step for obtaining a polymer gel from a monomer; (2) a drying step for drying this polymer gel to obtain a particulate water-absorbing resin; (3) a pulverization step for pulverizing the particulate water-absorbing resin obtained by this drying step; (4) a classification step for sieving this particulate water-absorbing resin; (5) a surface cross-linking step for cross-linking the neighborhood of the surface of this classified particulate water-absorbing resin to obtain a particulate water-absorbing agent; (6) a cooling step for cooling the particulate water-absorbing agent obtained by this surface cross-linking step; (7) a granule sizing step for granule sizing this cooled particulate water-absorbing agent; (8) a packaging step for packaging this granule sized particulate water-absorbing agent; (9) a transportation step for transporting the products such as the polymer gel, the particulate water-absorbing resin, the particulate water-absorbing agent, or the like, produced in each of the above steps, to the other steps; (10) a collection step for collecting the fine powders contained in gas composed principally of air, in any of the above steps, by use of the trapping material; and (11) a granulation step for granulating any of the fine powders selected from the fine powders collected in this collection step, the fine powders classified in the classification step, and the fine powders classified in the granule sizing step, to obtain granulated particles. In detail, the production method of the present invention can produce the particulate water-absorbing agent superior in various properties such as liquid permeability, absorbency against pressure, or the like, by collecting efficiently and reusing the fine powders (for example, the fine powders which have been removed as waste materials in the classification step included in a conventional production method) contained in the particulate water-absorbing agent obtained from the particulate water-absorbing resin, while preventing scattering thereof. This production method is suitable for continuous production of the particulate water-absorbing agent.

As will be described later, among the steps included in this production method, (3) the pulverization step, (6) the cooling step, (7) the granule sizing step and (11) the granulation step are performed as appropriate depending on specifications and the like of the particulate water-absorbing agent to be produced. In this production method, (1) the polymerization step, (2) the drying step, (4) the classification step, (5) the surface cross-linking step, (8) the packaging step, (9) the transportation step and (10) the collection step are the steps to be essentially included. This production method may include, or may not include the steps other than (1) the polymerization step, (2) the drying step, (4) the classification step, (5) the surface cross-linking step, (8) the packaging step, (9) the transportation step and (10) the collection step. Therefore, this production method includes the polymerization step for obtaining the polymer gel, the drying step for drying this polymer gel to obtain the particulate water-absorbing resin, the classification step for sieving this particulate water-absorbing resin, the surface cross-linking step for cross-linking the neighborhood of the surface of this particulate water-absorbing resin to obtain the particulate water-absorbing agent, the packaging step for filling a packaging material container with this particulate water-absorbing agent for packaging, and other steps which may be included further, and the transportation step for transporting the products produced in each of the above steps to the other steps. In this production method, the fine powders contained in gas in any of the above steps can be collected by use of a trapping material (the collection step). In this production method, one or two or more steps selected from (3) the pulverization step, (6) the cooling step, (7) the granule sizing step and (11) the granulation step are other steps which may be included further in this production method.

FIG. 1 is a schematic configuration drawing showing a production apparatus 2 to be used to produce the particulate water-absorbing agent. In this production apparatus 2, a plurality of apparatuses 4 are connected via a pipeline 6. The kind of these apparatuses 4 and combination thereof are determined as appropriate depending on specifications and the like of the particulate water-absorbing agent to be produced. In this production method, as these apparatuses 4, a polymerization apparatus 8, a drying apparatus 10, a pulverization apparatus 12, a classification apparatus 14, a mixing apparatus 16, a heating apparatus 18, a cooling apparatus 20, a granule sizing apparatus 22, a filling apparatus 24, a fine powder capturing apparatus 26, and a granulation apparatus 28 are installed in this production apparatus 2. It should be noted that, this pipeline 6 is not especially limited, as long as it has a function for connecting a plurality of apparatuses 4. As this pipeline 6, for example, a tube, a bucket conveyer, a belt conveyer or the like is included. When the tube is used as this pipeline 6, the transportation step may be performed by arranging the tube so that the longitudinal direction thereof extends in the vertical direction and then dropping the product freely in this tube. The transportation step may be performed by flowing gas inside the tube and by flow of this gas. It should be noted that, transportation by this gas flow is named pneumatic transportation.

In this production method, the polymerization step is performed using the polymerization apparatus 8. The drying step is performed using the drying apparatus 10. The pulverization step is performed using the pulverization apparatus 12. The classification step is performed using the classification apparatus 14. The surface cross-linking step is performed using the mixing apparatus 16 and the heating apparatus 18. The cooling step is performed using the cooling apparatus 20. The granule sizing step is performed using the granule sizing apparatus 22. The packaging step is performed using the filling apparatus 24. The collection step is performed u33 sing the fine powder capturing apparatus 26. The granulation step is performed using the granulation apparatus 28.

[The polymerization step]

The polymerization step is the step for polymerizing a monomer, which can become the water-absorbing resin by polymerization (hereafter may also be referred to as a monomer), to generate a polymer gel. A polymerization method used in the production method relevant to the present invention is not especially limited, and for example, bulk polymerization, precipitation polymerization, aqueous solution polymerization, reversed phase suspension polymerization or the like is included. In view of performance and easiness of polymerization control, aqueous solution polymerization or reversed phase suspension polymerization, where the monomer is used as an aqueous solution, is preferable. As will be described later, in this production method, the fine powders generating during the production can be removed effectively. This production method exerts this effect sufficiently in the water-absorbing resin obtained by aqueous solution polymerization. From this view point, in this production method, aqueous solution polymerization, in particular continuous aqueous solution polymerization is preferable. The polymerization apparatus 8 for performing the polymerization step is not especially limited, and a conventionally known one may be used.

The monomer is not especially limited, and, for example, one shown below is included: for example, an anionic unsaturated monomer such as (meth)acrylic acid, maleic acid (anhydride), itaconic acid, cinnamic acid, vinyl sulfonic acid, allyltoluene sulfonic acid, vinyltoluene sulfonic acid, styrene sulfonic acid, 2-(meth) acrylamido-2-methylpropane sulfonic acid, 2-(meth)acryloylethane sulfonic acid, 2-(meth) acryloylpropane sulfonic acid, 2-hydrokyethyl (meth)acryloyl phosphate, or the like, and a salt thereof; a mercapto group-containing unsaturated monomer; a phenolic hydroxy group-containing unsaturated monomer; an amide group-containing unsaturated monomer such as (meth)acrylamide, N-ethyl(meth)acrylamide, N,N-dimethyl (meth)acrylamide; an amino group-containing unsaturated monomer such as N,N-dimethylaminoethyl (meth)acrylate, N,N-dimethylaminopropyl (meth)acrylate, N,N-dimethylaminopropyl (meth) acrylamide, or the like; or the like. These monomers may be used alone or two or more kinds may be used in combination as appropriate. In view of performance and cost of the resultant water-absorbing resin, the water-absorbing resin is preferably a polyacrylic acid (salt)-based water-absorbing resin, and as a monomer therefor, it is preferable to use acrylic acid and/or a salt thereof (for example, a salt of sodium, lithium, potassium, ammonium, amines or the like, and among these the sodium salt is preferable in view of cost), as a principal component. As an acrylic acid to be used, conventionally known acrylic acid is used. Specifically, acrylic acid described in US-A-2001-0016668 and U.S. Pat. No. 6,596,901 may be used. Use amount of acrylic acid and/or the salt thereof is preferably equal to or more than 70% by mole, more preferably equal to or more than 80% by mole, further preferably equal to or more than 90% by mole, and particularly preferably equal to or more than 95% by mole relative to total monomer components (excluding an internal cross-linking agent to be described later). (The upper limit is 100% by mole.) It should be noted that, when the monomer is an acid group-containing monomer, neutralization rate thereof is not especially limited, and the polymer gel may be neutralized after polymerization, as needed. In applications which may contact a human body, such as hygiene goods, neutralization after polymerization is not necessary. This neutralization rate is preferably from 40% by mole to 90% by mole, and more preferably from 50% by mole to 80% by mole as a polymer.

When the above-described monomer is used as an aqueous solution in the polymerization step, concentration of the monomer in this aqueous solution (hereafter may also be referred to as "a monomer solution") is not especially limited, however, it is preferably within a range of 10 to 70% by weight and further preferably within a range of 20 to 60% by weight. In addition, when the aqueous solution polymerization or reversed phase suspension polymerization is performed, a solvent other than water may be used in combination, as needed. It should be noted that, kind of the solvent to be used in combination is not especially limited. Further, a polymerization inhibitor or an iron component may be contained in these monomers. As content of the iron component, equal to or less than 5 ppm by weight is preferable, and equal to or less than 1 ppm by weight is more preferable. In addition, the polymerization inhibitor is not especially limited, and, for example, methoxy phenols may be used preferably. In this case, use amount of the polymerization inhibitor is equal to or less than 160 ppm by weight, which has been disclosed in U.S. Pat. No. 7,049,366.

In the polymerization step, for example, a radical polymerization initiator may be used. This radical polymerization initiator is not especially limited, and one or more kinds may be selected and used from those utilized in usual polymerization of the water-absorbing resin, depending on the kind of the monomer to be polymerized, polymerization conditions and the like. For example, a thermal decomposition-type initiator (for example, a persulfate such as sodium persulfate, potassium persulfate, ammonium persulfate, or the like; a peroxide such as hydrogen peroxide, t-butylperoxide, t-butylhydroperoxide, methyl ethyl ketone peroxide, or the like; an azo compound such as an azonitrile compound, an azoamidine compound, a cyclic azoamidine compound, an azoamide compound, an alkylazo compound, 2,2'-azobis(2-amidinopropane) dihydrochloride, 2,2'-azobis[2-(2-imidazoline-2-yl) propane]dihydrochloride, or the like; or the like or a photodecomposition-type initiator (for example, a benzoin derivative, a benzyl derivative, an acetophenone derivative, a benzophenone derivative, an azo compound or the like); or the like may be included. Among these, in view of cost and reduction capability of residual monomer, the thermal decomposition type initiator is preferable, and a persulfate salt is particularly preferable. In addition, because combined use of a reducing agent can promote decomposition of the radical polymerization initiator, it is possible to make a redox-type initiator by combining both. The reducing agent is not especially limited, and, for example, sulfurous acid (salt) (for example, sodium sulfite, potassium sulfite, ammonium sulfite or the like), hydrogen sulfite (salt) (for example, sodium hydrogen sulfite, potassium hydrogen sulfite, ammonium hydrogen sulfite or the like) pyrosulfurous acid (salt), L-ascorbic acid (salt), a reductive metal (salt) such as ferrous salt or the like; dithio nous acid (salt), trithionous acid (salt), tetrathionous acid (salt), thiosulfurous acid (salt), dimethyl-sulfoxide, phosphorous acid (salt), nitrous acid (salt), thio-urea dioxide, amino acid, amines (ethanolamine or the like), or the like is included.

More preferable one is combined use of the photodecomposition-type initiator and the thermal decomposition-type initiator. Use amount of the radical polymerization initiator to be used in the above-described polymerization step is not especially limited. However, usually 0.001 to 2% by weight is preferable, and 0.01 to 0.5% by weight is more preferable relative to use amount of the monomer. The use amount of the radical polymerization initiator of below 0.001% by weight relative to use amount of this monomer, increases the unreacted monomer, and increases amount of residual monomers in the resultant water-absorbing resin, and is thus not preferable. On the other hand, this use amount of over 2% by weight increases water-soluble components in the resultant water-absorbing resin, and is thus not preferable. It should be noted that, in this polymerization step, instead of the above-described radical polymerization initiator, the monomer may be polymerized by irradiation of activated energy rays such as radiation rays, electron beams, UV rays, or the like.

In the polymerization step, an internal cross-linking agent may be used, as needed. As the internal cross-linking agent, a conventionally known internal cross-linking agent, having two or more polymerizable unsaturated groups or two or more reactive groups, in one molecule, is included. Specifically, for example, N,N'-methylenebis(meth)acrylamide, (poly)ethylene glycol di(meth)acrylate, (poly)propylene glycol di(meth) acrylate, trimethylolpropane tri(meth)acrylate, glycerin tri (meth)acrylate, glycerin acrylate methacrylate, ethylene oxide modified trimethylolpropane tri(meth)acrylate, pentaerythritol hexa(meth)acrylate, triallyl cyanurate, triallyl isocyanurate, triallyl phosphate, triallyl amine, polyallyloxy alkane, (poly) ethylene glycol diglycidyl ether, glecerol diglycidyl ether, ethylene glycol, polyethylene glycol, propylene glycol, glycerin, 1,4-butanediol, pentaerythritol, ethylene diamine, ethylene carbonate, propylene carbonate, polyethylene imine, glycidyl(meth)acrylate or the like is include. Among these, in consideration of reactivity, one or two or more kinds may be used. In particular, as the internal cross-linking agent, a compound having two or more polymerizable unsaturated groups is preferable. Use amount of the internal cross-linking agent may be determined as appropriate by desired property of the water-absorbing resin. However, usually use amount of the internal cross-linking agent is preferably in a range of 0.001 to 5% by mole relative to the monomer. Too low use amount of the internal cross-linking agent tends to decrease strength of the polymer gel and increase soluble content, and on the contrary, too much use amount tends to deteriorate property such as absorbency. It should be noted that, the internal cross-linking agent may be added to a reaction system once as a whole, or may be added dividedly.

In the polymerization step, further as needed, various foaming agents such as a carbonate (hydrogen) salt, carbon dioxide, an azo compound, an inert organic solvent, or the like; a hydrophilic polymer such as starch-cellulose, a derivative of starch-cellulose, polyvinyl alcohol, polyacrylic acid (salt), a cross-linked substance of polyacrylic acid (salt), or the like; various surfactants; a chain transfer agent such as hypophosphorous acid (salt), or the like; or the like, may be added to the reaction system, as appropriate, within a range not to impair effect of the present invention (for example, the various foaming agents in equal to or lower than 30 parts by weight, the hydrophilic polymer in equal to or lower than 30 parts by weight, and the chain transfer agent in equal to or lower than 1 part by weight relative to 100 parts by weight of the monomer).

Polymerization temperature in the polymerization step is not especially limited, but, setting at usually 10 to 140° C. is preferable. The polymerization temperature below 10° C. not only lengthens polymerization time and decreases productivity but also could deteriorate property of the water-absorbing resin. On the other hand, the polymerization temperature over 140° C. could deteriorate property of the water-absorbing resin. Polymerization time is also not especially limited, and may be determined as appropriate depending on kinds of the monomers and the polymerization initiator, polymerization temperature, or the like. In addition, the above-described polymerization is performed usually using the polymerization apparatus 8 under normal pressure, in view of easiness of operation thereof, however, in order to decrease boiling point during polymerization, it is also a preferable aspect that this polymerization is performed under reduced pressure.

In this production step, in view of performance and easiness of polymerization control, for example, in the polymerization apparatus 8, after mixing sodium persulfate as the thermal decomposition-type initiator and L-ascorbic acid as the reducing agent, into a monomer solution composed of an aqueous solution of a partial sodium salt of acrylic acid containing polyethylene glycol diacrylate as the internal cross-linking agent, this mixed solution may be supplied to a flat plane steel belt having a weir at the side, and aqueous solution polymerization may be performed continuously on this belt. Such a polymerization method is called belt polymerization. As a polymerization method other than this belt polymerization, continuous kneader polymerization described in Example 1 of U.S. Pat. No. 6,867,269 may be used. The water-absorbing resin having desired performance can be obtained in this case as well.

That is, in the present invention, it is preferable that the polymerization step is performed by continuous kneader polymerization or continuous belt polymerization. In such a case, irregular pulverized shaped particles with high property are obtained in high productivity in the subsequent drying step, or the like, but, the fine powders or powder dust tend to generate in the subsequent pulverization step, or the like. However, in order to solve such problems, the present invention can be applied suitably. The continuous kneader polymerization has been disclosed, for example, in U.S. Pat. No. 6,987,151 and U.S. Pat. No. 6,710,141. In addition, the continuous belt polymerization has been disclosed, for example, in U.S. Pat. No. 4,893,999, U.S. Pat. No. 6,241,928, and US-A-2005-215734 or the like.

[The drying step]

The drying step is the step for drying the polymer gel (water-containing gel-like polymer) with a water content of 15 to 70% by mass, obtained in the above-described polymerization step. From this view point, it is preferable that the drying apparatus 10 is installed at the downstream side of the polymerization apparatus 8. As shown in FIG. 1, in this production apparatus 2, the polymerization apparatus 8 and the drying apparatus 10 are jointed by the pipeline 6. In addition, the granulation apparatus 28 is connected to the pipeline 6 which connects the polymerization apparatus 8 and the drying apparatus 10. Preferably, the polymer gel obtained in this polymerization step is usually subjected to crushing treatment to make a particulate state of about 0.1 to 5 mm and supplied to the drying step. Because surface area of the gel increases by making particulate gel, the above-described drying step can progress smoothly. The crushing means is not especially limited, and, for example, various cutting means such as a meat chopper, a roller-type cutter, a guillotine cutter, a slicer, a roll cutter, a shredder, scissors, or the like may be used alone or in combination as appropriate. Further, particles granulated in the granulation step to be described later may be mixed with the crushed polymer gel, and supplied to the drying step. A drying method in this drying step is not especially limited, and, as the drying apparatus 10, a conductive heat transfer-type dryer, a radiation heat transfer-type dryer, a hot air heat transfer-type dryer, an inductive heating dryer, or the like is exemplified. In view of speed of drying, the hot air heat transfer-type dryer (hereafter, referred to as a hot air dryer) is preferable. As this hot air dryer, a drying apparatus such as a through-flow band-type, a through-flow circuit-type, a through-flow vertical-type, a parallel flow band-type, a through-flow tunnel-type, a through-flow groove-type, a fluidized bed-type, an air flow-type, a spray-type, or the like is included. In view of easiness of property control of the particulate water-absorbing agent, the band-type is preferable. As drying temperature, setting at relatively high temperature is preferable, specifically 80 to 300° C., preferably 100 to 250° C., more preferably 120 to 220° C., and still preferably 150 to 200° C. Drying time is not especially limited, and, it may be set at the time so as to attain desirable solid content rate of the resultant dried substance. It is preferable that solid content rate of the dried substance obtained in the drying step (specified as reduced weight on drying, obtained by drying 1 g of the particulate water-absorbing resin at 180° C. for 3 hours) is equal to or higher than 90% by weight, in view of easiness of pulverization. In general, in view of production efficiency, it is preferable that this drying time is usually within two hours, although it depends on particle diameter of the polymer gel, drying temperature, air volume or the like.

That is, increase in the solid content rate of the dried substance obtained in the drying step tends to generate the fine powders or powder dust easily in pulverization. However, b in order to solve such a problem, the present invention can be preferably applied in drying under condition of high temperature and high solid content.

[The pulverization step]

The pulverization step is the step for pulverizing a dried substance of the polymer gel. Pulverization is usually performed for a dried substance of the polymer gel obtained in the drying step, but, it may be performed for the polymer gel obtained in the polymerization step before drying. In view of easiness of pulverization, it is preferable that this step is performed for the dried substance obtained in the drying step. From this view point, it is preferable that the pulverization apparatus 12 is installed at the downstream side of the drying apparatus 10. As shown in FIG. 1, in this production apparatus 2, the drying apparatus 10 and the pulverization apparatus 12 are jointed by the pipeline 6. In this production method, the particulate water-absorbing resin as a pulverized substance can be obtained by pulverization. Pulverization is preferably performed so that the particulate water-absorbing resin with desired particle diameter (preferably, a weight average particle diameter of 200 to 800 μm) can be obtained as many as possible. A method for pulverization is not especially limited, and a conventionally known method can be adopted. As the pulverization apparatus 12 to be used in this pulverization step, a three-stage roll mill is exemplified. Because this pulverization generates the fine powders, the fine powders are included in the particulate water-absorbing resin obtained in the pulverization step. It should be noted that, when particle diameter of the particulate water-absorbing resin obtained in the drying step is small, it is not necessary to perform this pulverization step. This pulverization step is other step which may be included further in this production method, as needed. In this case, in the production apparatus 2 shown in FIG. 1, for example, the drying apparatus 10 and the classification apparatus 14 are directly jointed by the pipeline 6.

That is, the particulate water-absorbing resin obtained by the pulverization step becomes irregular pulverized shaped particles. Such a shape is preferable due to providing large specific surface area, and makes fixing to pulp easy as well. In addition, in the pulverization step, the fine powders or powder dust easily generate, however, because of enabling to solve such a problem, the present invention can be applied preferably.

[The classification step]

The classification step is the step for sieving the particulate water-absorbing resin with a sieve. In this production method, in view of easiness of sieving, it is preferable that the classification apparatus 14 is installed at the downstream side of the drying apparatus 10. When the pulverization step is included in this production method, the particulate water-absorbing resin having various particle diameters is obtained by this pulverization, and therefore, it is preferable that this classification apparatus 14 is installed at the downstream side of the pulverization apparatus 12. As shown in FIG. 1, in this production apparatus 2, the classification apparatus 14 is jointed at the downstream side of the pulverization apparatus 12 via the pipeline 6. In the classification step of this production method, pulverized substances obtained in the above-described pulverization step are sieved. In this classification step, for example, the classification apparatus 14 having a metal mesh is used. In this classification step, by selecting particles having desired particle diameter (preferably, a weight average particle diameter of 200 to 800 μm), by use of this classification apparatus 14, the desired particulate water-absorbing resin can be obtained. A classification method is not especially limited and a conventionally known method can be adopted. It should be noted that, in this production method, in this classification step, the particulate water-absorbing resin contained as the fine powders in the pulverized substance, may be obtained as a residual substance.

[The surface cross-linking step]

The surface cross-linking step is the step for cross-linking the neighborhood of the surface of the particulate water-absorbing resin obtained in the above-described classification step, using a surface cross-linking agent. By this step, the particulate water-absorbing agent is obtained. The particulate water-absorbing resin is a water swelling cross-linked polymer. This particulate water-absorbing resin has a cross-linked structure. In view of suppression of aggregation, it is preferable that this particulate water-absorbing resin is further cross-linked, and cross-link density of the surface thereof or the neighborhood of the surface is increased as compared with that of the inside. It should be noted that, "the surface or the neighborhood of the surface" indicates a part of the surface layer, and a part with a thickness of equal to or less than several tens μdm or equal to or less than 1/10 of total thickness, and this thickness is determined as appropriate depending on objectives. In such a particulate water-absorbing resin, (1) the surface thereof may be cross-linked with an organic surface cross-linking agent and/or a water-soluble inorganic surface cross-linking agent, exemplified as a surface cross-linking agent to be described later, (2) a cross-linkable monomer may be cross-linking polymerized at the surface thereof (for example, as disclosed in U.S. Pat. No. 7,201,941), or (3) the surface thereof may be radical cross-linked with a persulfate salt or the like (for example, as disclosed in U.S. Pat. No. 4,783,510). In addition, in view of productivity, it is preferable that the cross-linking reaction of this particulate water-absorbing resin is promoted by heating or radiation rays (preferably UV rays as disclosed in EP No. 1824910). By surface cross-linking of the surface or the neighborhood of the surface of the particulate water-absorbing resin, absorbency against pressure (AAP) of the particulate water-absorbing agent, in other word, absorbing capability against pressure can be increased. In further detailed description, "surface cross-linking" in the present application means that a region of the surface or the neighborhood of the surface of the particulate water-absorbing resin was surface cross-linked by chemical or physical modification. For example, in the case of partially neutralized cross-linked polyacrylic acid, as an example, chemical modification means a state that the surface cross-linking was performed with the organic surface cross-linking agent having two or more functional groups which are able to react with a functional group, in particular, a carboxyl group, present at the neighborhood of the surface of the particles (for example, a polyvalent alcohol, a polyvalent glycidyl compound, a polyvalent amine or the like). Other than this, it includes surface cross-linking by ionic bond of a surface carboxyl group by use of a polyvalent metal, such as, for example, trivalent aluminum. The bonding form in the surface cross-linking is not especially limited. In the present invention, the particulate water-absorbing resin cross-linked at the surface or the neighborhood of the surface is the particulate water-absorbing agent.

As the surface cross-linking agent, which can be used in the surface cross-linking step, a conventionally known surface cross-linking agent exemplified in U.S. Pat. No. 6,228,930, U.S. Pat. No. 6,071,976, U.S. Pat. No. 6,254,990 or the like is used suitably. It is preferable to use one or two or more kinds of a surface cross-linking agent having dehydration esterification reactivity, selected from a group consisting of an oxazolidinone compound, an alkylene carbonate compound, a polyvalent alcohol compound, and an oxetane compound. In such a surface cross-linking step, although the particulate water-absorbing agent with high property is obtained, it is necessary to perform the dehydration esterification reaction under high temperature condition, which decreases water content of this particulate water-absorbing agent. Therefore, although the fine powders or powder dust may sometimes generate, in order to solve such problems, the present invention can be applied suitably.

Specifically, although not limited, they include an (mono-, di- or poly-)oxazolidinone compound such as 2-oxazolidinone, or the like (U.S. Pat. No. 6,559,239); an alkylene carbonate compound such as 1,3-dioxolane-2-one, 4-methyl-1,3-dioxolane-2-one, 4,5-dimethyl-1,3-dioxolane-2-one, 4,4-di-methyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6-dimethyl-1,3-dioxane-2-one, 1,3-dioxolane-2-one, or the like (U.S. Pat. No. 5,409,771); a polyhydric alcohol compound such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerin, polyglycerin, 2-butene-1,4-diol, 1,4-butanediol, 1,5-pentanediol, 1,6-hexanediol, 1,2-cyclohexanedimethanol, 1,2-cyclohexanediol, trimethylol propane, diethanol amine, triethanol amine, polyoxypropylene, an oxyethylene-oxypropylene block copolymer, pentaerythritol, sorbitol, or the like; an oxetane compound (US-A-2002/72471). Among them, at least one kind selected from the polyhydric alcohol having carbon atoms of 2 to 10, and the oxetane compound having carbon atoms of 2 to 10 are more preferable. The polyhydric alcohol having carbon atoms of 3 to 8 is particularly preferable. In addition to these, an epoxy compound such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, glycidol, or the like; a polyvalent amine compound such as ethylenediamine, diethylenetriamine, triethylenetetramine, tetraethylenepentamine, pentaethylenehexamine, polyethyleneimine, or the like, or an inorganic salt or an organic salt (an aziridinium salt or the like) thereof; a polyvalent isocyanate compound such as 2,4-tolylene diisocyanate, hexamethylene diisocyanate, or the like; a polyvalent oxazoline compound such as 1,2-ethylene-bis-oxazoline, or the like; a halo-epoxy compound such as epichlorohydrin, epibromohydrin, α-methylepichlorohydrin, or the like; a polyvalent metal compound such as a hydroxide or chloride of zinc, calcium, magnesium, aluminum, iron, zirconium or the like; or the like may be used.

As the surface cross-linking agent, the exemplified compounds may be used alone or two or more kinds may be used in combination. In this surface cross-linking step, a method for surface cross-linking with a monomer containing a cross-linking agent (JP No. 2530668), a method for surface cross-linking with a radical initiator (JP-A-63-99211), a method for surface cross-linking with a radical initiator and a monomer (US-A-2005/0048221) or the like, may suitably be used. It should be noted that, use amount of the surface cross-linking agent is preferably from 0.001 part by weight to 5 parts by weight, relative to 100 parts by weight of the water-absorbing resin.

In the surface cross-linking step, in addition to the surface cross-linking agent, an organic acid (lactic acid, citric acid, p-toluenesulfonic acid) or the like or a salt thereof, an acid substance of an inorganic acid (phosphoric acid, sulfuric acid, sulfurous acid) or a salt thereof, a basic substance such as sodium hydroxide or sodium carbonate or the like, a polyvalent metal salt such as aluminum sulfate or the like, may be used in combination, in 0 to 10% by weight, further preferably 0 to 5% by weight, and particularly preferably about 0 to 1% by weight, relative to the water-absorbing resin.

In the surface cross-linking step, use amount of the above-described surface cross-linking agent depends on the surface cross-linking agent selected. However, use amount from 0.001 part by weight to 10 parts by weight is preferable, and from 0.01 part by weight to 5 parts by weight is more preferable, relative to 100 parts by weight of solid content of the particulate water-absorbing resin. By using the surface cross-linking agent in this range, cross-link density of the neighborhood of the surface of the particulate water-absorbing agent can be made higher than that of the inside. The case where the use amount of the surface cross-linking agent exceeds 10 parts by weight is not only uneconomical but also makes excessive supply of the cross-linking agent for forming an optimal cross-link structure to the particulate water-absorbing resin, and is thus not preferable. The case where the use amount of the surface cross-linking agent is below 0.001 part by weight does not provide sufficient improvement effect in enhancing performance of absorbency against pressure or the like of the particulate water-absorbing agent, and is thus not preferable.

In the surface cross-linking step, it is preferable to use water as a solvent in mixing the particulate water-absorbing resin and the surface cross-linking agent. Use amount of water depends on the kind of the water-absorbing resin, particle diameter, and water content of the particulate water-absorbing resin or the like. However, use amount over 0 part by weight and equal to or lower than 20 parts by weight is preferable, and use amount within a range of 0.5 to 10 parts by weight is more preferable, relative to 100 parts by weight of solid content of the particulate water-absorbing resin. In mixing the particulate water-absorbing resin and the surface cross-linking agent, a hydrophilic organic solvent may be used in combination, as needed. In this case, as the hydrophilic organic solvent to be used in combination, for example, lower alcohols such as methyl alcohol, ethyl alcohol, n-propyl alcohol, isopropyl alcohol, n-butyl alcohol, isobutyl alcohol, t-butyl alcohol, or the like; ketones such as acetone, or the like; ethers such as dioxane, tetrahydrofuran, or the like; amides such as N,N-dimethylformamide, or the like; sulfoxides such as dimethylsulfoxide, or the like; or the like is included. Use amount of the hydrophilic organic solvent depends on the kind of the water-absorbing resin, particle diameter and water content of the particulate water-absorbing resin or the like. However, use amount from 0 to equal to or lower than 20 parts by weight is preferable, and use amount within a range of 0 to 10 parts by weight is more preferable, relative to 100 parts by weight of solid content of the particulate water-absorbing resin.

In performing surface cross-linking, a method for mixing a surface cross-linking agent solution containing the surface cross-linking agent and the solvent, by spraying or dropping with a sprayer or the like to the particulate water-absorbing resin is preferable, and a method for mixing by spraying is more preferable. Size of a droplet sprayed is preferably within a range of 0.1 to 300 µm, and more preferably within a range of 0.1 to 200 µm, as an average particle diameter.

The particulate water-absorbing resin and the surface cross-linking agent solution are mixed by use of the mixing apparatus 16. As shown in FIG. 1, this mixing apparatus 16 is jointed at the downstream side of the classification apparatus 14 via the pipeline 6. This mixing apparatus 16 preferably has large mixing force to uniformly and surely mix both. As the mixing apparatus 16, for example, a cylinder-type mixing machine, a double wall cone-type mixing machine, a high speed stirring-type mixing machine, a V-type mixing machine, a ribbon-type mixing machine, a screw-type mixing machine, a twin arm-type kneader, a pulverizing-type kneader, a rotation-type mixing machine, an air flow-type mixing machine, Turbulizer®, a batch-type Rhedige® mixer, a continuous Rhedige® mixer or the like is suitable.

In the surface cross-linking step, a mixture of the particulate water-absorbing resin and the surface cross-linking agent solution enables to perform surface cross-linking even at room temperature. However, in view of promotion of the reaction as well as removal of water and solvent added, it is preferable that, after mixing the particulate water-absorbing resin and the surface cross-linking agent, further heating treatment is performed to cross-link the neighborhood of the surface of the particulate water-absorbing resin. In this heating treatment, treatment temperature is preferably equal to or higher than 80° C., although it depends on the surface cross-linking agent selected. The treatment temperature of below 80° C. takes longer time in the heating treatment, and thus not only incurs decrease in productivity but also cannot attain uniform surface cross-linking. In this case, concerned is that not only absorption characteristics under pressure of the particulate water-absorbing agent decreases, but also the unreacted surface cross-linking agent remains. The treatment temperature over 250° C. incurs deterioration of the particulate water-absorbing resin, and decreases performance of the particulate water-absorbing agent obtained by surface cross-linking, and is thus not preferable. From this view point, the treatment temperature (temperature of a heating medium or temperature of a material (in particular, temperature of the heating medium) is preferably in a range of 100 to 250° C., more preferably in a range of 150 to 250° C. (in particular, it is suitable for the surface cross-linking agent having dehydration esterification reactivity). Heating time is preferably in a range of 1 minute to 2 hours. Suitable examples of a combination of heating temperature and heating time are at 180° C. for 0.1 to 1.5 hour, and at 200° C. for 0.1 to 1 hour.

As the heating apparatus 18 for performing the heating treatment, a conventional dryer or a heating furnace is used. For example, a dryer or a heating furnace of a conductive heat transfer-type, a radiation heat transfer-type, a hot air heat transfer-type, an inductive heating-type is suitable. Specifically, a dryer or a heating furnace of a belt-type, a groove stirring-type, a screw-type, a rotation-type, a disk-type, a kneading-type, a fluid bed-type, an air flow-type, an infrared ray-type, an electron beam-type is included. As shown in FIG. 1, in this production apparatus 2, the heating apparatus 18 is jointed at the downstream side of the mixing apparatus 16 via the pipeline 6.

In the surface cross-linking step, the heating treatment may be performed in a static state or under stirring. When the heating treatment is performed under stirring, the surface cross-linking may be completed by heating the mixture in the mixing apparatus 16, where the particulate water-absorbing resin and the surface cross-linking agent were mixed, or the surface cross-linking may be completed by heating this mixture, by charging the mixture, for example, into a twin-screw groove-type stirring drying apparatus.

[The cooling step]

The cooling step is the step performed arbitrarily after the surface cross-linking step, for example, the step disclosed in U.S. Pat. No. 6,378,453. This cooling step is the step wherein the particulate water-absorbing agent obtained by heating and cross-linking the neighborhood of the surface in the above-described surface cross-linking step is cooled before charging to the granule sizing step to be described later. The cooling apparatus 20 to be used in this cooling step is not especially limited, and, for example, a twin-screw stirring dryer or the like, where cooling water of about 35° C. is passed through inside of the inner wall or other heat transfer surfaces can be used. As described above, in the surface cross-linking step, surface cross-linking of the particulate water-absorbing resin may be performed at room temperature. In this case, because the particulate water-absorbing agent obtained by the surface cross-linking is not heated, this cooling step may not be performed. This cooling step is other step which may be included further in this production method, as needed. As shown in FIG. 1, in this production apparatus 2, the cooling apparatus 20 is jointed at the downstream side of the heating apparatus 18 by the pipeline 6.

[The addition step of additives]

In the present invention, the addition step for adding additives other than the surface cross-linking agent may be installed further. This addition step is preferably installed at and after the polymerization step, and more preferably installed at and after the drying step. The additives may be added in the cooling step or other steps. As the additives, for example, the following (A) a deodorant component (preferably, a plant component), (B) a polyvalent metal salt, (C) an inorganic particle (including (D) a composite water-containing oxide), (E) a liquid permeability improver, (F) other additives and the like may be added. By this addition, various functions can be furnished to the particulate water-absorbing agent. Further, the following (G) chelating agent may be added to the particulate water-absorbing agent. In the step for using such additives, the water-absorbing agent with high property (for example, high SFC) can be obtained. However, the additives themselves can become powder dust. Therefore, in order to solve such problems, the present invention can be applied suitably.

In this production method, use amount of the (A) to (E) and (F) differs depending on objectives and functions to be furnished, and, it is usually, as addition amount of one kind thereof, in a range of 0.001 to 10 parts by weight, preferably 0.001 to 5 parts by weight, and further preferably 0.002 to 3 parts by weight, relative to 100 parts by weight of the water-absorbing resin. Usually, when this addition amount is lower than 0.001 part by weight, sufficient effect and functions to be furnished by the additives cannot be obtained, and when this addition amount is over 10 parts by weight, effect comparable to the addition amount cannot be obtained or water absorbing performance decreases.

(A) The Deodorant Component

The particulate water-absorbing agent obtained by the production method of the present invention can be formulated with the deodorant component, preferably the plant component, in the above-described amount, to exert deodorant property. As the plant component, at least one kind of a compound selected from polyphenol, flavone(s), and caffeine is preferable, and at least one kind of a compound selected from tannin, tannic acid, gall, gallnut and gallic acid is further preferable. As a plant containing the plant component which can be added to the particulate water-absorbing agent, other than these plant components, for example, camellia, *Eurya japonica, Ternstroemia gymnathera* or the like is included as the *Theaceous* plant; rice, bamboo grass, bamboo, corn, wheat or the like is included as the *Poaceae* plant, and coffee or the like is included as the *Rubiaceae* plant. As a form of the plant component, which can be used in the present invention, essence (essential oil) extracted from a plant, a plant itself, a plant residue or an extract residue by-produced in the production process in plant processing industry or food processing industry, or the like is included, but it is not especially limited.

(B) The Polyvalent Metal Salt

The polyvalent metal salt may be formulated into the particulate water-absorbing agent obtained by the production method of the present invention, in order to enhance liquid permeability and powder hygroscopic fluidity. Preferable amount of this polyvalent metal salt is as described above. As this polyvalent metal salt, a polyvalent metal salt of an organic acid and a polyvalent metal salt of an inorganic acid are exemplified. As the preferable inorganic polyvalent metal salt, for example, aluminum chloride, aluminum polychloride, aluminum sulfate, aluminum nitrate, potassium aluminum bissulfate, sodium aluminum bissulfate, potassium alum, ammonium alum, sodium alum, sodium aluminate, calcium chloride, calcium nitrate, magnesium chloride, magnesium sulfate, magnesium nitrate, zinc chloride, zinc sulfate, zinc nitrate, zirconium chloride, zirconium sulfate, zirconium nitrate or the like is included. In addition, in view of solubility with an absorbing liquid such as urine, use of a salt having crystal water thereof is preferable. A particularly preferable one is an aluminum compound. Among this aluminum compound, aluminum chloride, aluminum polychloride, aluminum sulfate, aluminum nitrate, potassium aluminum bissulfate, sodium aluminum bisulfate, potassium alum, ammonium alum, sodium alum, sodium aluminate are preferable, and aluminum sulfate is particularly preferable. Powders of water-containing crystal such as aluminum sulfate-octadeca hydrate salt, aluminum sulfate-tetradeca to octadeca hydrate salt may be used most suitably. They may be used as only one or two more kinds may be used in combination. In view of handling property and mixing property with the particulate water-absorbing agent, the polyvalent metal salt is used preferably in a solution state, and is used particularly preferably in an aqueous solution state.

In addition, polyvalent metal salts of organic acids to be used, and mixing methods thereof are exemplified, for example, in U.S. Pat. No. 7,282,262. As the polyvalent metal salt of the organic acid, having carbon atoms of equal to or more than 7 in the molecule, to be used in the present invention, a metal salt other than an alkaline salt, of an aliphatic acid, a petroleum acid, a polymer acid or the like, is included. As an organic acid composing a polyvalent metal salt of this organic acid, an aliphatic acid having a long chain or a branched chain, such as capronic acid, octylic acid, octynoic acid, decanoic acid, lauric acid, myristic acid, palmitic acid, oleic acid, stearic acid, or the like; a petroleum acid such as benzoic acid, myristicinic acid, naphthenic acid, naphthoic acid, naphthoxyacetic acid, or the like; a polymer acid such as poly(meth)acrylic acid, polysulfonic acid, or the like can be exemplified. However, an organic acid having a carboxyl group in the molecule is preferable, and an aliphatic acid such as capronic acid, octylic acid, octynoic acid, decanoic acid, lauric acid, myristic acid, palmitic acid, oleic acid, stearic acid, a cow aliphatic acid, a castor oil hardened aliphatic acid is more preferable. An aliphatic acid not having an unsaturated bond in the molecule, such as capronic acid, octanoic acid, decanoic acid, lauric acid, myristic acid, palmitic acid, or stearic acid is further preferable. And a long chain aliphatic acid with carbon atoms of equal to or more than 12, not having an unsaturated bond in the molecule, such as lauric acid, myristic acid, palmitic acid, and stearic acid is most preferable.

(C) The Inorganic Particle

The inorganic particle, in particular, a water-insoluble inorganic particle may be formulated into the particulate water-absorbing agent obtained by the production method of the present invention in order to prevent blocking in moisture absorption. As the inorganic particle to be used in the present invention, specifically, for example, a metal oxide such as silicon dioxide, titanium oxide, or the like; silicic acid (salt) such as natural zeolite, synthetic zeolite, or the like; kaolin, talc, clay, bentonite or the like is included. Among these, silicon dioxide and silicic acid (salt) are more preferable, and silicon dioxide and silicic acid (salt), having an average particle diameter of 0.001 to 200 μm, measured by the Coulter counter method, are further preferable.

(D) The Composite Water-Containing Oxide

The particulate water-absorbing agent obtained by the production method of the present invention shows superior hygroscopic fluidity (fluidity of powders after the water-absorbing resin or the water-absorbing agent absorbed moisture), and further, in order to make exert superior deodorant function, a composite water-containing oxide containing zinc and silicon, or a composite water-containing oxide containing zinc and aluminum may be formulated.

(E) The Liquid Permeability Improver

The liquid permeability improver means the additive such as a water-insoluble inorganic fine particle, a water-soluble polyvalent metal salt, a water-soluble polymer, polyamine, for enhancing saline flow conductivity (SFC) of the water-absorbing resin or the water-absorbing agent having a saline flow conductivity (SFC) of equal to or higher than 6 ($\times 10^{-7} \cdot cm^3 \cdot s \cdot g^{-1}$) to be described later, by equal to or higher than 10 ($\times 10^{-7} \cdot cm^3 \cdot s \cdot g^{-1}$). Therefore, even the additives exemplified in the (A) to (D) may correspond to this liquid permeability improver. In this production method, this liquid permeability improver is preferably a water-soluble polyvalent metal compound or a polycation compound. Specifically, it is preferably a compound of one or more kinds selected from a group consisting of an aluminum compound, a zirconium compound, a titanium compound, and a compound having an amino group. In more specifically, for example, the water-soluble polyvalent metal compound such as aluminum sulfate, potassium alum, ammonium alum, sodium alum, (poly)aluminum chloride, a hydrate thereof, or the like exemplified in the above-described (B); the polycation compound such as the polymeric polyamine compound, preferably the water-soluble polymeric polyamine, more specifically, polyethyleneimine, polyvinylamine, polyallylamine, or the like having a weight average molecular weight of 200 to 1000000; the water-insoluble inorganic fine particle such as silica, alumina, bentonite, or the like; or the like is included, and they may be used as only one kind, or may be used in two or more kinds in combination. Among these, the water-soluble polyvalent metal salt such as aluminum sulfate, potassium alum or the like is preferable in view of enhancing saline flow conductivity (SFC). In addition, the liquid permeability improver is preferably an aqueous solution, in view of easily adding more uniformly to the whole surface of the water-absorbing resin, and having no segregation or the like of the liquid permeability improver. The liquid permeability improver is used preferably in a ratio of 0.001 to 10% by weight, and more preferably in a ratio of 0.01 to 5% by weight, relative to the water-absorbing resin.

(F) Other Additives

To the particulate water-absorbing agent obtained by the production method of the present invention, as needed, for example, a disinfectant, an antimicrobial agent, perfume, various inorganic powders, a foaming agent, a pigment, a dye, a hydrophilic staple fiber, a fertilizer, an oxidizing agent, a reducing agent, water-soluble salts, or the like may be added, as appropriate, in a range not to impair effect of the present invention (for example, equal to or less than 30 parts by weight, and further equal to or less than 10 parts by weight, relative to 100 parts by weight of the particulate water-absorbing agent), and thereby various functions can be furnished.

(G) The Chelating Agent

The particulate water-absorbing agent to be used in the present invention may contain the chelating agent. The mixing step of the chelating agent is not especially limited, but, it is preferable that the chelating agent is mixed to the monomer or monomer solution. As the chelating agent, a polymer chelating agent and a non-polymer chelating agent are exemplified. Preferably the non-polymer chelating agent containing an acid group, and further preferably, the non-polymer chelating agent containing a phosphoric acid group or a carboxylic acid group is used. The number of the acid group contained in this non-polymer chelating agent is 2 to 100, further preferably 2 to 50, and particularly preferably, 2 to 10. As this chelating agent, a non-polymer chelating agent containing nitrogen is used, or a chelating agent containing nitrogen may also be used suitably. As this chelating agent, for example, an amino carboxylic acid-type metal chelating agent such as iminodiacetic acid, hydroxyethyliminodiacetic acid, nitrilotriacetic acid, nitrilotripropionic acid, ethylenediamine tetraacetic acid, hydroxyethylenediamine triacetic acid, hexamethylenediamine tetraacetic acid, diethylenetriamine pentaacetic acid, triethylenetetramine hexaacetic acid, trans-1,2-diaminocyclohexane tetraacetic acid, bis(2-hydroxyethyl)glycin, diaminopropanol tetraacetic acid, ethylenediamine-2-propionic acid, glycol ether diamine tetraacetic acid, bis(2-hydroxybenzyl)ethylenediamine diacetic acid, and a salt thereof; and a phosphorous compound such as ethylenediamine-N,N'-di(methylenephosphinic acid), ethylenediamine tetra(methylenephosphinic acid), nitriloacetic acid-di(methylenephosphinic acid), nitrilodiacetic acid-(methylenephosphinic acid), nitriloacetic acid-β-propionic acid-methylenephosphonic acid, nitrilo tris(methylenephosphonic acid), cyclohexanediamine tetra(methylenephosphonic acid), ethylenediamine-N-N'-diacetic acid-N,N'-di(methylenephosphonic acid), ethylenediamine-N-N'-di(methylenephosphonic acid), ethylenediamine tetra(methylenephosphonic acid), polymethylenediamine tetra(methylenephosphonic acid), diethylenetriamine penta (methylenephosphonic acid), and 1-hydroxyethylidene diphosphonic acid, and a salt thereof; are included. Use amount of the chelating agent is preferably from 10 ppm by weight to 1000 ppm by weight, relative to 100 parts by weight of the water-absorbing resin.

The additives exemplified in the (B) to (E) may be added as an aqueous solution or a water dispersion solution. In addition, when these additives are solid, they may be subjected to dry mixing into the water-absorbing resin, as powders (preferably having a particle diameter of equal to or smaller than 300 μm).

In addition, the (B) and (E) can be used suitably as a surface treatment agent. Surface treatment in the present application means that a region of the surface or the neighborhood of the surface of the water-absorbing resin has been surface cross-linked by chemical or physical modification. In this case, chemical modification means a state of modification accompanying with any of a chemical bonding, and physical modification means physical covering or attachment without accompanying with the chemical bonding. Bonding form in the surface treatment is not especially limited. In addition, the surface treatment is a concept including the surface cross-linking. Further, the surface treatment includes surface cross-linking with ionic bond of a surface carboxyl group by a polyvalent metal, such as trivalent aluminum, in addition to the surface cross-linking by the above cross-linking agent. These surface treatments are chemical modification accompanying with chemical bonding such as covalent bonding or ionic bond with the water-absorbing resin. On the other hand, physical modification indicates a modified state of the same surface or the neighborhood of the surface of the water-absorbing resin modified only by physical attachment, without taking a form of chemical bonding such as covalent bonding or ionic bond with the water-absorbing resin. Such a state is also included in the surface treatment in the present application. For example, the above-described state covered with the polyvalent alcohol, or a state covered with the water-soluble polyvalent metal salt without accompanying with chemical bonding is a surface treated state.

In particular, in the present invention, the polyvalent metal salt is preferable as the additives for enhancing liquid permeability. It is preferable that the polyvalent metal salt is mixed after the addition. As an apparatus for mixing, for example, a cylinder-type mixing machine, a screw-type mixing machine, a screw-type extruder, Turbulizer®, Nauta®-type mixing machine, a V-type mixing machine, a ribbon-type mixing machine, a twin arm-type kneader, a fluidized-type mixing machine, an air flow-type mixing machine, a rotating disk-type mixing machine, a roll mixer, a rolling-type mixing machine, Rhedige® mixer, or the like may be included.

It should be noted that, the polyvalent metal salt is preferably mixed with the water-absorbing resin as an aqueous solution. Size of a droplet of the aqueous solution can be adjusted as appropriate. In view of preventing permeation and diffusion of a polyvalent metal ion (for example, an aluminum ion) into the inside of the water-absorbing resin, the aqueous solution preferably has a concentration of equal to or higher than 50%, more preferably equal to or higher than 60%, further preferably equal to or higher than 70%, further preferably equal to or higher than 80%, and particularly preferably equal to or higher than 90%, relative to saturated concentration at the predetermined temperature. Naturally, it may be an aqueous solution having the saturated concentration (=100% relative to the saturated concentration), or a dispersion solution having over the saturated concentration. Temperature of the aqueous solution is adjusted as appropriate in a range of equal to or lower than boiling point to adjust solubility or viscosity, and however, mixing is usually performed at about room temperature.

[The Granule Sizing Step]

Although the particle diameter was adjusted in the above-described pulverization step and classification step, an aggregated substance having large particle diameter might be included in the particulate water-absorbing agent after the cooling step. This aggregated substance may be generated principally during mixing the surface cross-linking agent, or during a surface cross-linking reaction. In this granule sizing step, crushing treatment and classification treatment of this aggregated substance is performed. Such a granule sizing method has been disclosed in U.S. Pat. No. 7,347,330, US-A-2005-011325 or the like. Order and number of this granule sizing treatment and classification treatment is not especially limited. This granule sizing step is the step where particle diameter is adjusted again, and for example, firstly the classification treatment is performed for the particulate water-absorbing agent. In this classification treatment, a classification apparatus such as a sieve or an air flow classification machine can be used. In this classification treatment, the aggregated substance having large particle diameter can be obtained, for example, by using a sieve having large sieve mesh size. In this way, after the aggregated substance having large particle diameter is removed, the fine powders having small particle diameter are removed by using a sieve having small sieve mesh size. For the aggregated substance obtained by this classification treatment, the crushing treatment is performed. By this crushing treatment, particles composing the aggregated substance can be crushed and separated to an individual particle, and the particulate water-absorbing agent as a single particle can be obtained. In this crushing treatment, for example, a knife cutter-type crushing machine is used. For the crushed substance obtained by this crushing treatment, the classification treatment is performed again. In this granule sizing step, while the fine powders having small particle diameter are removed, the particulate water-absorbing agent having desired particle diameter (preferably, a weight average particle diameter of 200 to 800 μm) can be obtained. In view of productivity, this granule sizing step is preferably performed after the cooling step. In this production method, an apparatus to be used in this crushing treatment and an apparatus to be used in the classification treatment are jointed by a pipeline different from the pipeline 6, to configure the granule sizing apparatus 22. As shown in FIG. 1, this granule sizing apparatus 22 is jointed at the downstream side of the cooling apparatus 20 via the pipeline 6. In this production method, when the particulate water-absorbing agent before charging into this granule sizing step does not contain the aggregated substance having large particle diameter, this granule sizing step may not be performed. This granule sizing step is other step which may be included further in this production method, as needed. When this granule sizing step is not installed, a filling apparatus 24 to be described later is jointed at the downstream side of this cooling apparatus 20 via the pipeline 6. It should be noted that, in this granule sizing step, in this production method, the particulate water-absorbing agent contained as the fine powders may be obtained as a residual substance.

[The Packaging Step]

The packaging step is the step for filling the packaging material container with the particulate water-absorbing agent. In this packaging step of this production method, the particulate water-absorbing agent, which was granule-sized in the above-described granule sizing step, is packaged. For example, in this packaging step, the particulate water-absorbing agent transferred to a hopper for storage fills a storing bag as the packaging material container, by use of the filling apparatus 24. In this production method, the particulate water-absorbing agent filling the storing bag is shipped as a product after the predetermined inspection. As shown in FIG. 1, this filling apparatus 24 is jointed at the downstream side of the granule sizing apparatus 22 via the pipeline 6.

[The Transportation Step]

In this production method, the transportation step is the step for transporting a product such as the polymer gel, the particulate water-absorbing resin, the particulate water-absorbing agent, or the like generated in each of the steps, to the other steps. In this transportation step, for example, by controlling pressure inside the pipeline 6, which connects the apparatuses 4 themselves installed at each of the steps, a product generated in one step is transported to other step. In this production method, for example, a product such as the polymer gel, the particulate water-absorbing resin, the particulate water-absorbing agent, or the like is transported by pneumatic transportation. It should be noted that, a product generated in one step may be transported to other step, by connecting the apparatus 4 to be used at one step, and the apparatus 4 to be used at other step via a transportation machine such as a conveyor. In this production method, for example, by the transportation step, the polymer gel produced in the polymerization step is transported to the drying apparatus 10. By the transportation step, the dried substance of the polymer gel dried in the drying step is transported to the pulverization apparatus 12. By the transportation step, the particulate water-absorbing resin obtained in the pulverization step is transported to the classification apparatus 14. By the transportation step, the particulate water-absorbing resin sieved in the classification step is transported to the mixing apparatus 16. By the transportation step, the particulate water-absorbing resin cross-linked at the surface part thereof in the surface cross-linking step is transported to the cooling apparatus 20. By the transportation step, the particulate water-absorbing resin cooled in the cooling step is transported to the granule sizing apparatus 22. Alternatively, by the transportation step, the particulate water-absorbing agent obtained from the particulate water-absorbing resin sieved in the classification step is transported to the granule sizing apparatus 22. By the transportation step, the particulate water-absorbing agent granule-sized in the granule sizing step is transported to the filling apparatus 24. Alternatively, by the transportation step, the particulate water-absorbing agent cooled in the cooling step is transported to the filling apparatus 24.

In this production method, even in the case where the step other than the above steps is included, it is preferable that a product produced in this other step is transported to any of the steps by the transportation step. According to this production method, the particulate water-absorbing agent can be produced continuously.

[The Collection Step]

As described above, in this production method, the fine powders generate by pulverizing the dried polymer gel in the pulverization step. The fine powders generate also by crushing treatment in the granule sizing step. Further, the fine powders might also generate by wear or the like of the particulate water-absorbing resin and the particulate water-absorbing agent during transportation in the transportation step. Further, the fine powders may also generate when the particulate water-absorbing agent suffers damage at and after the heating process in the surface cross-linking step. Further, in observing the captured substance captured by the fine powder capturing apparatus 26 to be described later, by use of a scanning electron microscope, an X-ray micro-analyzer or the like, the presence of the aggregated substance of inorganic fine particles, composed of silicon dioxide or the like, having a longer diameter of from 20 μm to 100 μm, other than the fine powders, might be confirmed in this captured substance. Presence of such an aggregated substance is caused by the additives and dust in gas. In this production method, by the collection step, such an aggregated substance may also be removed along with the fine powders.

In the present invention, usually, the fine powders (below 150 μm) caused by the particulate water-absorbing resin and the particulate water-absorbing agent are contained in a ratio of from 85% by mass to 99.9% by mass, relative to total mass of the fine powders collected. The fine powders caused by the additives and dust in gas are contained in a ratio of from 0.1% my mass to 15% by weight, relative to total mass of the fine powders collected. These fine powders are contained in gas in the step in a ratio of from 0.01 g/cm$^3$ to 100 g/cm$^3$. By removal of the fine powders contained in this gas, work environment may be enhanced. Removal of the fine powders may also contribute to enhancement of the property of the particulate water-absorbing agent. In addition, because the fine powders caused by the particulate water-absorbing resin and the particulate water-absorbing agent are contained as principal components, recycling of the fine powders is possible. The fine powders collected in the collection step can be returned to any of the steps included in this production method, in the recycling. For example, the fine powders can be added to a raw material (a monomer) in the polymerization step, and to the polymer gel in the drying step. The fine powders can also be added to the granulated particles in the granulation step. The recycle can reduce waste amount of the water-absorbing resin and water-absorbing agent. And, in the case where the fine powders can be collected in a range of equal to or lower than 10% by weight of total production amount of the particulate water-absorbing agent, this production method can maintain the quality of the particulate water-absorbing agent in high level, and thus become more effective.

In the production method of the present invention, in any of the above steps, the fine powders can be present in gas in the step. In this case, "in the step" is a concept including (1) inside of the apparatuses 4 for performing each step or inside of the pipelines 6, (2) inside of the surrounding covering the apparatuses 4 for performing the step or the pipelines 6, and (3) inside of a room where the apparatuses 4 for performing the step or the pipelines 6 are positioned. In this production method, the collection step is the step where the fine powders contained in gas in any of the steps can be collected, by use of the trapping material. As described above, in this collection step, the fine powder capturing apparatus 26 is used. In this production method, the fine powders are transported by the transportation step to the fine powder capturing apparatus 26 to be used in this collection step.

The fine powders are those having smaller particle diameter than that of the particulate water-absorbing agent aiming to obtain by the production method of the present invention, and conventionally, they have been usually treated as waste materials. The fine powders are residue after removal so that weight average particle diameter (D50) of the obtained particulate water-absorbing agent becomes within a range of 200 to 800 μm, and are those having a particle diameter of below 150 μm. Specifically, they are the particulate water-absorbing resin and the particulate water-absorbing agent which can pass through a JIS standard sieve having a sieve mesh size of 150 μm. Weight average particle diameter (D50) of the fine powders is usually in a range of equal to or larger than 10 μm and below 150 μm. Preferably, it is desirable that the fine powders contain particles having a particle diameter (specified by the JIS standard sieve classification) of practically below 150 μm, in 70 to 100% by weight, further 90 to 100% by weight. In addition, as shape of the fine powders, one with a sphere obtained by reversed phase suspension polymerization, and one with an irregular shape obtained by aqueous solution polymerization are included. In view of strength of the granulated particles obtained in the granulation step to be described later, as this shape, an irregular one obtained by aqueous solution polymerization is particularly preferable. In addition, the fine powders may be one being subjected or not subjected to the surface cross-linking treatment, or may be a mixture thereof.

As described above, the fine powders are classified to the fine powders 1 generating in a production process at and after the addition step of the additives, and the fine powders 2 generating in a production process before the addition step of the additives. Content of the additives in the fine powders 1 is preferably 0.001 to 99.99% by mass, more preferably 0.01 to 99.99% by mass, and further preferably 0.1 to 99.99% by mass, relative to total mass of the fine powders 1. In addition, content of the additives in the fine powders 2 is preferably 0 to 0.1% by mass, more preferably 0 to 0.01% by mass, and more preferably 0 to 0.001% by mass, relative to total mass of the fine powders 2. It should be noted that, kinds of the additives include (A) the deodorant component (preferably, the plant component), (B) the polyvalent metal salt, (C) the inorganic particle (including (D) the composite water-containing oxide), (E) the liquid permeability improver, (F) other additives and the like and (G) the chelating agent, described above. In particular, when (B) the polyvalent metal salt is added, it becomes possible to enhance liquid permeability, or prevent blocking of the resultant particulate water-absorbing agent.

For example, explanation will be given in the case where the production step of the particulate water-absorbing agent is composed of, in the order of the steps, (1) the polymerization step, (2) the drying step, (3) the pulverization step, (4) the classification step, (5) the surface cross-linking step, (6) the cooling step, (7) the granule sizing step, (8) the packaging step, (10) the collection step and (11) the granulation step. If the additives are added in (6) the cooling step, the fine powders generating in each of the steps of (6), (7) and (8), and (9) the transportation step between their steps are called the fine powders 1, and the fine powders generating in each of the steps of (1), (2), (3), (4) and (5), and (9') the transportation step between their steps are called the fine powders 2.

As the production step of the particulate water-absorbing agent where this production method and the collection method are applied, it is preferable to be (1) the polymerization step, (2) the drying step, (3) the pulverization step, (4) the classification step, (5) the surface cross-linking step, (7) the granule sizing step, (8) the packaging step, and (9) the transportation step. It is more preferable to include (2) the drying step other than the above steps. It is further preferable to include (6) the cooling step other than the above steps. It is particularly preferable to include (11) the granulation step other than the above steps.

Figure 2:
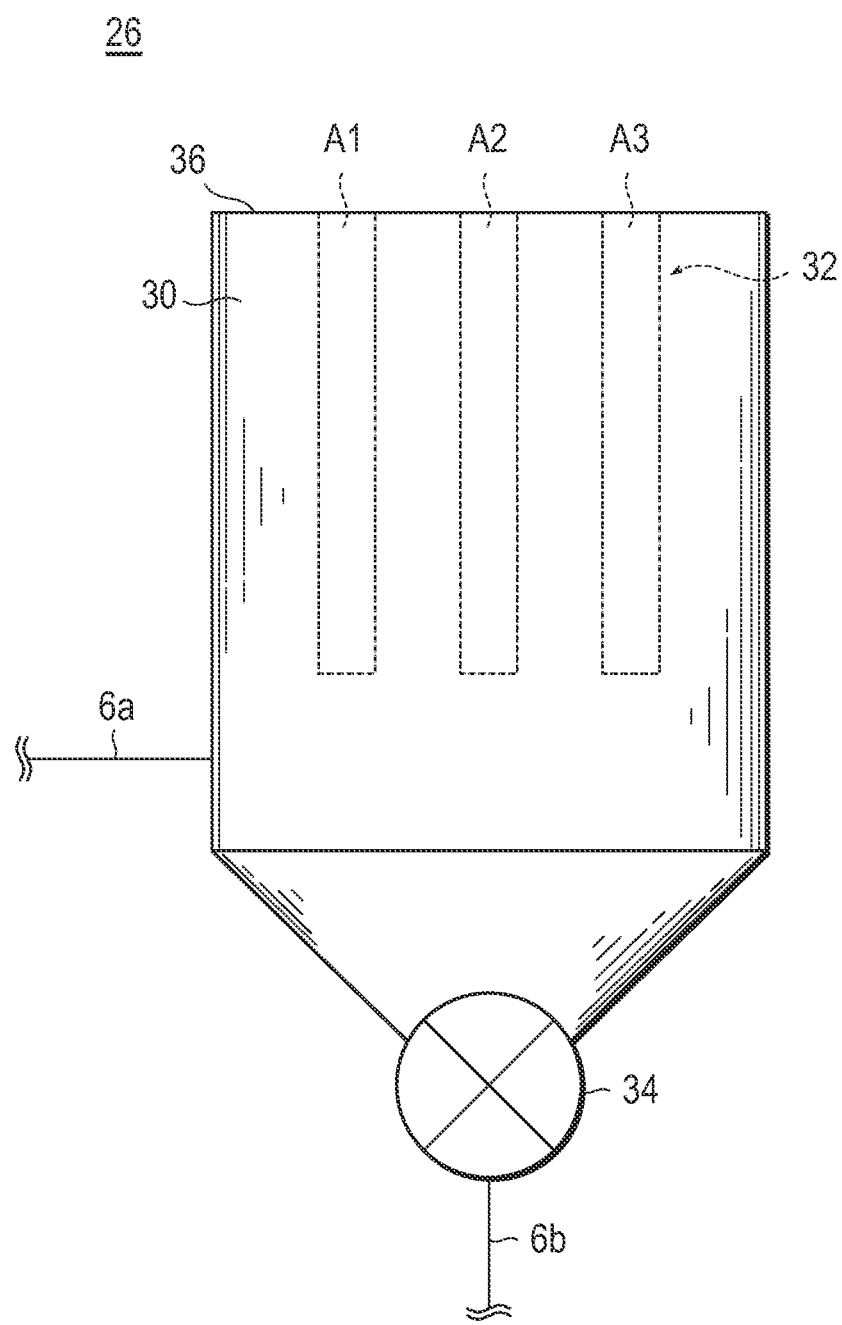
FIG. 2 is a schematic drawing showing apart of the fine powder capturing apparatus included in the production apparatus of FIG. 1.

FIG. 2 is a schematic drawing showing apart of the fine powder capturing apparatus 26 included in the production apparatus of FIG. 1. This fine powder capturing apparatus 26 can collect the fine powders. This fine powder capturing apparatus 26 is provided with a tank 30, a capturing part 32 and an open/close part 34.

The tank 30 is nearly cylinder-like or cubic. A part at the lower side of this tank 30 gives a shape narrowing toward the tip. Although not shown, at the upper surface 36 of this tank 30, an opening part is installed, and at the lower side of this opening part, the capturing part 32 is attached. As shown, three capturing parts 32 are installed at this fine powder capturing apparatus 26, and therefore three opening parts (the positions shown by A1, A2 and A3 in Figure) is attached at this tank 30. As shown, a first pipeline 6a is jointed to this tank 30.

Figure 3:
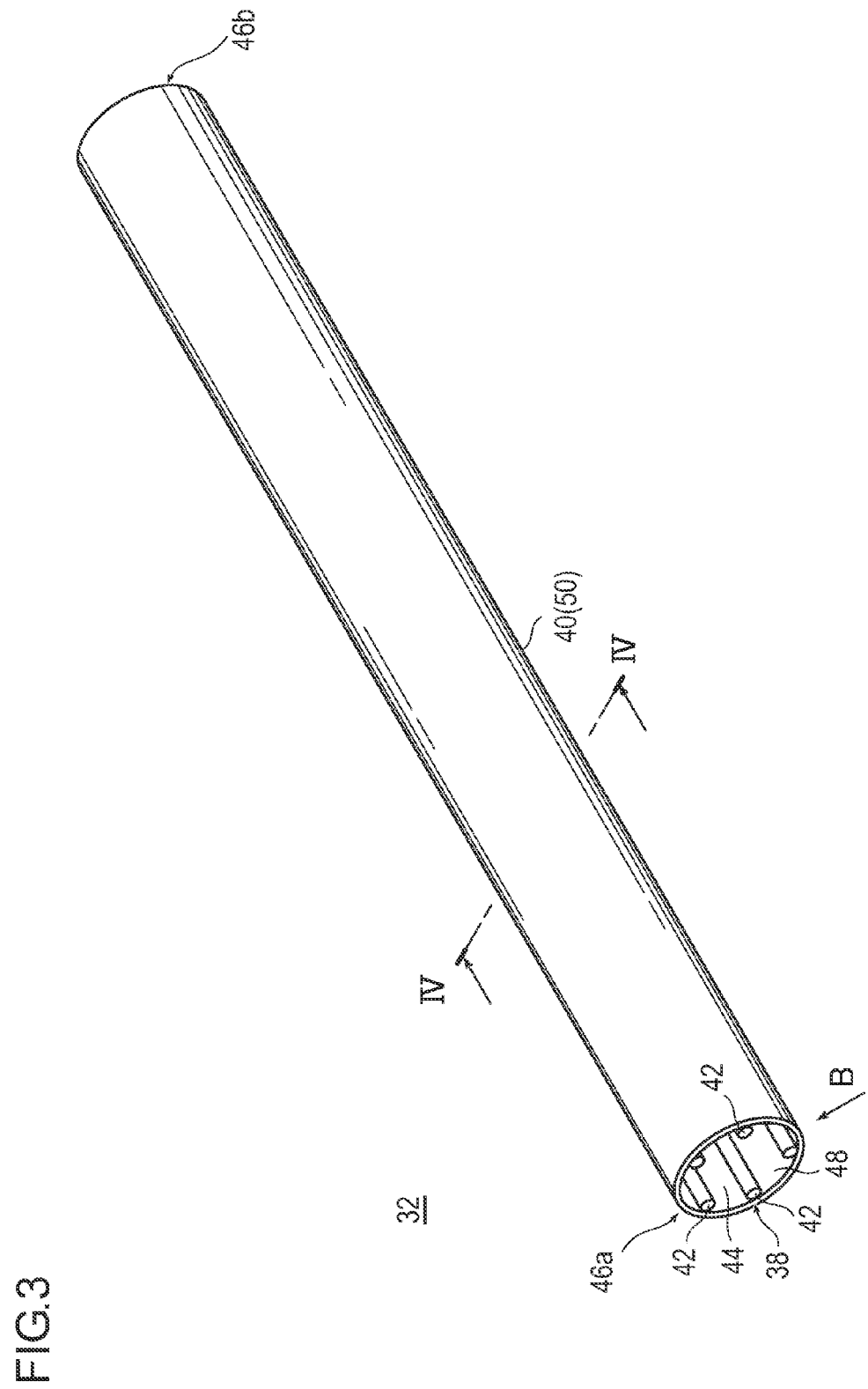
FIG. 3 is a perspective view showing a capturing part installed at the fine powder capturing apparatus of FIG. 2.
Figure 4:
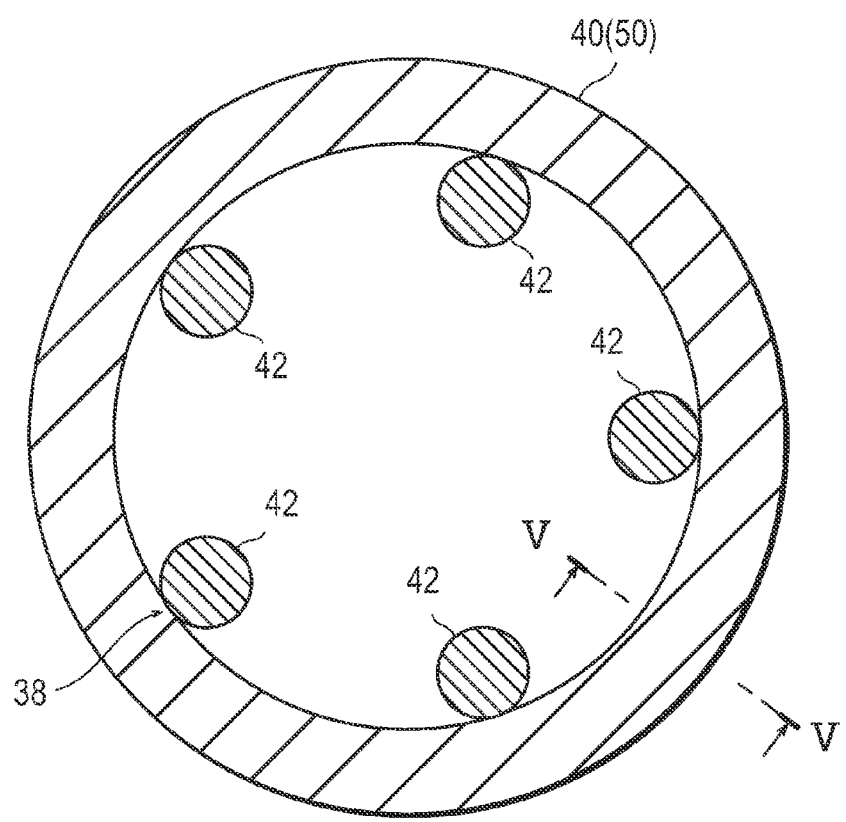
FIG. 4 is a cross-sectional view along the IV-IV line of FIG. 3.

FIG. 3 is a perspective view showing a capturing part 32 installed at the fine powder capturing apparatus 26 of FIG. 2. FIG. 4 is a cross-sectional view along the IV-IV line of FIG. 3. In this fine powder capturing apparatus 26, this capturing part 32 is attached at the upper surface 36 of the tank 30, so that a part shown by the arrow line B of FIG. 3 is positioned at the upper side. This capturing part 32 is provided with a supporting member 38 and a trapping material 40. This supporting member 38 is a cylinder-shape frame. This supporting member 38 is configured by aligning five bars 42 at the same circumference. Although not shown, these bars 42 are connected by a plurality of ring-like members, in view of form maintenance of this supporting member 38. In this fine powder capturing apparatus 26, the opening part 44 of this supporting member 38 is made coincident with the opening part installed at the upper surface 36 of the tank 30, and this supporting member 38 is fixed at the upper surface 36 of the tank 30.

At one end 46a in the length direction of this trapping material 40, an insertion port 48 is installed. The other end 46b in the length direction of the trapping material 40 is blocked. This trapping material 40 is a cylindrical bag. This trapping material 40 covers the supporting member 38. The supporting member 38 is covered with this trapping material 40. This trapping material 40 is configured so that particles contained in this gas can be removed by passing through of gas. Such a trapping material 40 is also called a bag filter. The shape and form of the fine powder capturing apparatus 26 described above are only one example and there are various types of the fine powder capturing apparatus 26. The shape and form of the fine powder capturing apparatus 26 should not be restricted to the above example.

In FIG. 2, the open/close part 34 is installed at the lower side of the tank 30. The second pipeline 6b is jointed to this open/close part 34. This open/close part 34 is positioned between the second pipeline 6b and the tank 30. This open/close part 34 is what is called a valve.

In the production method of the present invention, gas flows into the tank 30 through the first pipeline 6a. This gas passes through the trapping material 40. Gas passed through this trapping material 40 is discharged to the outside of this fine powder capturing apparatus 26.

In the production method of the present invention, this fine powder capturing apparatus 26 is jointed to any of the apparatuses 4 used in the above steps and the pipelines 6 which connect them, by the first pipeline 6a. In the fine powder capturing apparatus 26 shown in FIG. 1, the first pipeline 6a is connected to at least any of the positions shown by the arrow lines S1 to S20 in FIG. 1. This first pipeline 6a may be connected to any of S1 to S20, or may be connected to a plurality of positions among S1 to S20, or may be connected to all of S1 to S20. This connection position is determined as appropriate in consideration of generation state of the fine powders. By this connection, the fine powders present in any of the steps are transported to this fine powder capturing apparatus 26 through the first pipeline 6a. This first pipeline 6a may be branched so as to be able to be connected to a plurality of positions.

As described above, in the classification step, the fine powders are classified. The fine powders are contained in gas in this step or in the step installed at the downstream side of this step. In view of enhancement of trapping efficiency of the fine powders, it is more preferable that the first pipeline 6a is jointed to the classification apparatus 14 (S6). It is more preferable that this first pipeline 6a is jointed to the heating apparatus 18 (S10). It is more preferable that this first pipeline 6a is jointed to the cooling apparatus 20 (S12). In viewpoint that obstruction of surface cross-linking by the fine powders is suppressed effectively, it is more preferable that this first pipeline 6a is jointed to the pipeline 6 (S7) installed between this classification apparatus 14 and the mixing apparatus 16.

As described above, also in the granule sizing step, the fine powders are classified. The fine powders are contained in gas in this step or in the step installed at the downstream side of this step. In view of enhancement of trapping efficiency of the fine powders, it is preferable that the first pipeline 6a is jointed to the granule sizing apparatus 22 (S14). In addition, it is preferable that this first pipeline 6a is jointed to the filling apparatus 24 (S16). In viewpoint that the fine powders are collected efficiently and the high quality particulate water-absorbing agent can be obtained, it is particularly preferable that the first pipeline 6a is jointed to the classification apparatus 14 (S6), the pipeline 6 (S7), the heating apparatus 18 (S10), the cooling apparatus 20 (S12), the granule sizing apparatus 22 (S14) and the filling apparatus 24 (S16).

In the production method of the present invention, the fine powders collected with this fine powder capturing apparatus 26 are discharged through the second pipeline 6b. Preferably, this fine powder capturing apparatus 26 is connected to the granulation apparatus 28 for performing the granulation step to be described later, by the second pipeline 6b. In this case, the granulated substance obtained by granulating the fine powders is let into the apparatuses 4 to be used in the above steps, via the pipeline 6. As shown in FIG. 1, in this production apparatus 2, the granulation apparatus 28 is connected to the pipeline 6 which connects the polymerization apparatus 8 and the drying apparatus 10. In this way, the fine powders collected by the fine powder capturing apparatus 26 are charged to the drying step via the granulation step through the second pipeline 6b. In the production method of the present invention, the fine powders can be reused without being disposed. This reuse may contribute to reduction of production cost. In this production method, unit number of the fine powder capturing apparatus 26 installed in the production apparatus 2 may be one unit, or two or more units.

In the production method of the present invention, gas flowing in the first pipeline 6a passes through the trapping material 40. The fine powders present inside this first pipeline 6a have a large specific surface area, and are thus aggregated even by a trace of moisture contained in the gas. Attachment and deposition of this aggregated substance onto the surface of the trapping material 40 result in obstructing trapping efficiency of the fine powders. From this viewpoint, in this production method, it is preferable that this trapping material 40 is heated. Temperature of this trapping material 40 is preferably equal to or higher than 35° C., more preferably 40 to 150° C., and further 60 to 100° C. A heating method for the trapping material 40 is not especially limited, and, for example, a method for heating the tank 30 from outside thereof by using a steam trace, an electric heater or the like as a heat source is included.

As described above, in the production method of the present invention, the trapping material 40 is configured so that particles contained in this gas can be removed by passage of gas. The fine powders generating in producing the particulate water-absorbing agent are carried to this fine powder capturing apparatus 26 by the gas and captured by this trapping material 40. That is, in this collection step, the fine powders contained in the gas in the step can be collected by use of the trapping material 40. In the production method of the present invention, because the gas from which the fine powders have been removed are discharged outside, the fine powders do not fly as dust. In the production method for the particulate water-absorbing agent of the present invention, good work environment can be maintained.

In the collection method and the production method of the present invention, the fine powders are shaken off by physical (mechanical) impact. In the present invention, physical (mechanical) impact means to give impact by coercive external force. As such a method, for example, a vibrator using electric power or compressed air as an energy source, or sine-vibration-like shaking by crank mechanism, vibration by a magnet, or wave pulse by abrupt on-off blowing of compressed air or the like is included.

In the production method of the present invention, the fine powder capturing apparatus 26 is vibrated, and the fine powders captured by the trapping material 40 are sieved off. In this fine powder capturing apparatus 26, the fine powders may be sieved off by spraying pulse air from an insertion port 48 of this trapping material 40. The fine powders sieved off are transported to the granulation apparatus 28 to be used in the granulation step to be described later, through the second pipeline 6b. This fine powder capturing apparatus 26 is superior in trapping efficiency of the fine powders. According to this production method, the fine powders generating in a production process can be collected efficiently while preventing scattering thereof. From the viewpoint that the fine powders are sieved off effectively, it is preferable that the trapping material 40 is installed at the side of the upper surface 36 of the tank 30.

Further, in the production method of the present invention, because the fine powders are removed efficiently from the particulate water-absorbing agent, the particulate water-absorbing agent superior in properties such as absorbency against pressure or liquid permeability can be obtained. In addition, because this production method is superior in trapping efficiency of the fine powders, by effective reuse of the fine powders thus collected, effect in view of production cost of reuse of the fine powders, can be obtained as well.

In the production method of the present invention, it is preferable that the trapping material 40 superior in trapping efficiency of JIS 12-type carbon black (particle diameter: 0.03 μm to 0.2 μm) is used in the fine powder capturing apparatus 26. The fine powder capturing apparatus 26 provided with trapping material 40 having high trapping efficiency can prevent deterioration of work environment caused by exhaustion of the fine powders, as well as can collect the fine powders efficiently. From this viewpoint, this trapping efficiency is preferably equal to or higher than 90%, more preferably equal to or higher than 95%, still preferably equal to or higher than 99.9%, and particularly preferably equal to or higher than 99.99%. The upper limit of the trapping efficiency is not especially limited, and, the higher is the better.

The trapping efficiency of the trapping material 40 is measured by a method, for example, JIS B9908:2001 type 1. In a more simple way, the trapping efficiency can be measured by use of a commercial dust meter. This trapping efficiency can be obtained substantially, based on amount of the fine powders before passing through the trapping material 40, and amount of the fine powders after passing through the same. Specifically, by measuring amount of the fine powders contained in the gas flowing inside the first pipeline 6a of FIG. 2, amount of the fine powders W0 (mg/m$^3$) before passing through the trapping material 40 is obtained. By measuring amount of the fine powders contained in the gas discharged from the opening part of the tank 30 installed at the position shown by A1 to A3 of FIG. 2, amount of the fine powders Wf (mg/m$^3$) after passing through the trapping material 40 is obtained. By using W0 and Wf obtained in this way, the trapping efficiency is calculated, based on the following calculation equation. It should be noted that, as this dust meter, for example, a product name "P5L Digital Dust Meter", manufactured by Shibata Scientific Technology, Ltd. is included.

Trapping efficiency (%)=(1−Wf/W0)×100     [Expression 1]

In the production method of the present invention, when the fine powders reach inside the trapping material 40 and are captured, the fine powders clog the trapping material 40, resulting in obstruction of passing through this trapping material 40. From this viewpoint, as this trapping material 40, it is preferable that the fine powders do not reach inside thereof and are captured at the surface thereof. Use of such a trapping material 40 not only traps the fine powders stably but also enables to reduce exchange frequency of this trapping material 40. The production method including the collection step of the fine powders by such a trapping material 40 can contribute to productivity of the particulate water-absorbing agent.

In the production method of the present invention, the trapping material 40 installed at the fine powder capturing apparatus 26 is not especially limited, and, filter cloth or a membrane filter made of woven fabric or nonwoven fabric is included. Among them, as the trapping material 40, it is preferable to use the membrane filter. In the fine powder capturing apparatus 26 shown in FIG. 2, the membrane filter 50 is used as the trapping material 40.

Figure 5:
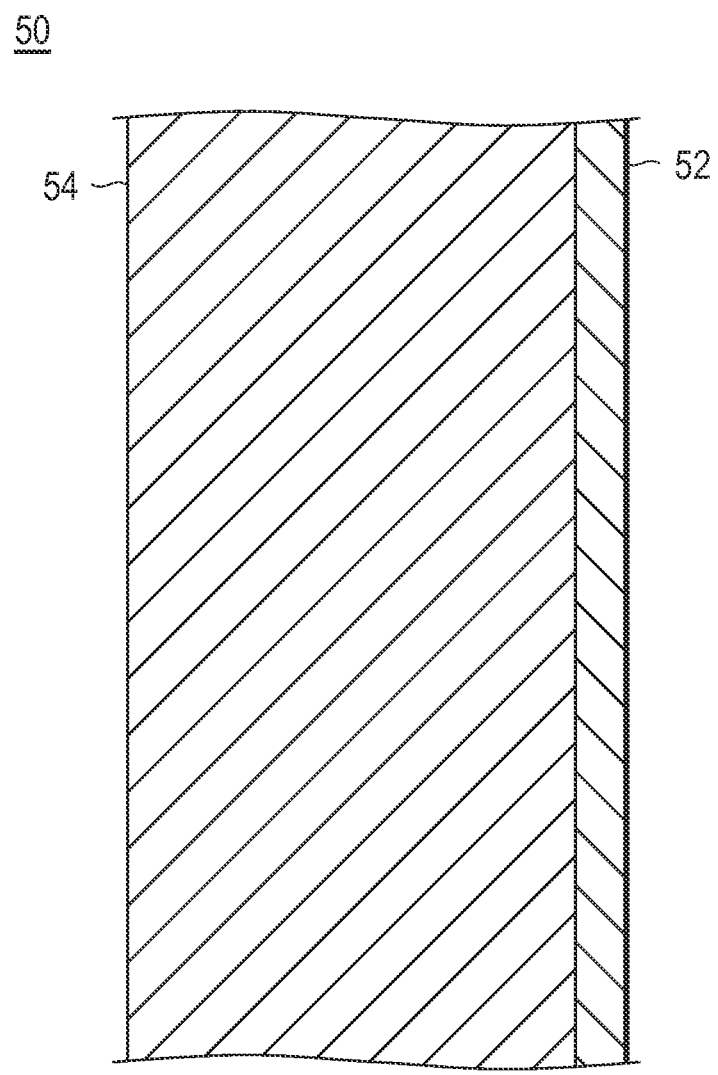
FIG. 5 is a cross-sectional view along the V-V line of FIG. 4.

FIG. 5 is a cross-sectional view along the V-V line of FIG. 4. In this FIG. 5, a part of the membrane filter 50 is shown. In this FIG. 5, the right side of the paper plane is the outside of the capturing part 32, and the left side of the paper plane is the inside of the capturing part 32. As shown in FIG. 5, the membrane filter 50 is composed of a membrane 52 and a substrate 54. Although not shown, the membrane 52 contains many fine pores or fine clearances. These pores or clearances are continuous in the thickness direction (lamination direction of the substrate and the membrane). This membrane 52 can make gas passed through. The membrane 52 is laminated on the substrate 54. The substrate 54 can support the membrane 52. Although not shown, the substrate 54 contains many fine pores or fine clearances. This substrate 54 can make gas passed through.

In the production method of the present invention, the substrate 54 is positioned at the side of the supporting member 38, and the membrane 52 is positioned at the outside of the substrate 54. This membrane 52 configures the external surface of the capturing part 32.

In the production method of the present invention, the gas flowing inside the tank 30 through the first pipeline 6a passes through the substrate 54 after passing though the membrane 52. The gas which has passed through this substrate 54 is discharged to the outside of the fine powder capturing apparatus 26.

In the production method of the present invention, size of the pores or clearances contained in the membrane 52 is smaller than particle diameter of the fine powders generating in production of the particulate water-absorbing agent. Specifically, size (pore size) of the pores or clearances contained in the membrane is preferably 0.1 to 20 μm, and particularly preferably 1 to 5 μm. In such a form, the fine powders carried to the fine powder capturing apparatus 26 contained in the gas are captured at the surface of this membrane 52. This membrane filter 50 can suppress the flow out of the fine powders to the outside of the fine powder capturing apparatus 26. In the production method of the present invention, because the gas from which the fine powders have been removed are discharged outside, the fine powders do not fly as dust. Because the fine powders are captured by the trapping material 40, the fine powders can be collected efficiently. According to the production method of the present invention, the fine powders generating in a production process can be collected efficiently, while preventing scattering thereof. In the production method of the present invention, because the fine powders are removed efficiently from the particulate water-absorbing agent, the particulate water-absorbing agent superior in properties such as absorbency against pressure, liquid permeability, or the like can be obtained.

In the production method of the present invention, because the fine powders are captured at the surface of the membrane 52, they never reach the substrate 54 through the membrane 52. Because intrusion of the fine powders into the inside of the membrane filter 50 is suppressed, clogging of the membrane filter 50 caused by the fine powders can be prevented. That is, in this membrane filter 50, because the fine powders captured at the surface of the membrane are removed simply by physical impact (for example, pulse wave), difference between mass before using the membrane and mass after using the membrane is small. In this production method, amount per unit hour (hereafter, permeation flux) of the gas passing through this membrane filter 50 can be maintained suitably. Therefore, this membrane filter 50 can contribute to decrease in pressure loss of this fine powder capturing apparatus 26. This membrane filter 50 can reduce running cost. The production method of the present invention is superior in productivity. In this way, in the production method of the present invention, because the fine powders are removed efficiently from the particulate water-absorbing agent, the particulate water-absorbing agent superior in properties such as absorbency against pressure, liquid permeability, or the like can be obtained.

This membrane filter 50 inhibits intrusion of the fine powders inside thereof, differently from the filter cloth made of only nonwoven fabric. This membrane filter 50 is superior to this filter cloth in durability. Use of this membrane filter 50 can further reduce exchange frequency of the trapping material 40 in the fine powder capturing apparatus 26. This membrane filter 50 can reduce running cost. This production method is superior in productivity. The collection method and the production method of the present invention are superior in productivity of the particulate water-absorbing agent. In particular, when the particulate water-absorbing agent contains an additive such as the (B) polyvalent metal salt, the fine powders 1 containing the additive has high probability not to be captured sufficiently with the filter cloth. When the membrane filter is used, because the fine powders are captured at the surface of the filter, penetration amount thereof can be reduced to a large degree.

In the production method of the present invention, size of the pores or clearances contained in the substrate 54 are not especially limited, as long as it is larger than that of the pores or clearances contained in the membrane 52. This substrate 54 can contribute to increase of permeation flux of the membrane filter 50. This membrane filter 50 can contribute to decrease of pressure loss of this fine powder capturing apparatus 26. This membrane filter 50 can reduce running cost. This production method is superior in productivity.

In the production method of the present invention, because the substrate 54 can support the membrane 52, this membrane filter 50 can be configured so that the membrane 52 has small thickness. The membrane 52 having small thickness can contribute to increase of permeation flux of this membrane filter 50. This membrane filter 50 can contribute to decrease of pressure loss of this fine powder capturing apparatus 26. In this way, this membrane filter 50 can reduce running cost. The production method of the present invention is superior in productivity. From this view point, thickness of this membrane 52 is preferably equal to or smaller than 0.5 mm, further preferably equal to or smaller than 0.3 mm, and particularly preferably equal to or smaller than 0.1 mm. The lower limit of the thickness of the membrane 52 is not especially limited, but is 0.01 mm. Thickness of the substrate 54 is preferably 1 to 5 mm, and particularly preferably 2 to 3 mm.

As described above, in the production method of the present invention, by passing the gas containing the fine powders in the step through the trapping material 40, the fine powders are collected. Area of the outer surface of this trapping material 40 can contribute to trapping efficiency of the fine powders. Because three capturing parts 32 are installed in this fine powder capturing apparatus 26, total area of the outer surface of the trapping material 40 installed at each capturing part 32, is effective area which can contribute to trapping efficiency. In this production apparatus 2, because this outer surface is composed of the side surface and the disk-like bottom surface, area of this outer surface is expressed by sum of area of the side surface obtained by outer diameter and length of this trapping material 40, and area of this bottom surface.

In the production method of the present invention, in view of trapping efficiency, durability of the trapping material 40, and reduction of blowing energy cost due to pressure loss, linear velocity (permeation flux) of the gas (principally air) passing through the surface of the trapping material 40 is preferably equal to or lower than 5 m/min, more preferably equal to or lower than 3 m/min, and particularly preferably equal to or lower than 2 m/min. In particular, when the membrane-type trapping material 40 such as the membrane filter 50 is used, this permeation flux is more preferably equal to or lower than 3 m/min, and particularly preferably equal to or lower than 2 m/min. It should be noted that, the lower limit value of this permeation flux is about 0.1 m/min. Here, linear velocity (permeation flux) of the gas means a value of total amount of gas passing through the trapping material 40 divided by total area of the outer surface of the trapping material 40.

In the production method of the present invention, in view of trapping efficiency, internal volume of the tank 30 of the fine powder capturing apparatus 26 is preferably equal to or larger than 1.5 times, more preferably equal to or larger than 2 times, and particularly preferably equal to or larger than 3 times of total volume of the trapping material 40. From the viewpoint that trapping efficiency of the fine powders can be maintained suitably, this internal volume is preferably equal to or larger than 4 times of total of this volume. The upper limit of this internal volume is about 10 times of total of this volume. Here, volume of the trapping material 40 means volume of space inside the trapping material 40 in the fine powder capturing apparatus 26 in operation.

As described above, the trapping material is a cylindrical bag. Shape of this trapping material is not especially limited thereto. This trapping material may be disk-like, or nearly rectangle-like. From the viewpoint that the contact area is secured sufficiently, this trapping material is preferably the cylindrical bag.

In the production method of the present invention, in viewpoint that large permeation flux can be obtained, as the substrate 54, woven fabric, nonwoven fabric, sponge or the like is exemplified. In view of general purpose properties, this substrate 54 is preferably nonwoven fabric. As a material of this substrate 54, polyester, polypropylene, polyacrylonitrile, nylon, polytetrafluoroethylene, polyphenylenesulfide, glass fiber, aramid fiber and polyimide are exemplified. The material of this substrate 54 may be determined as appropriate in consideration of operation condition or the like of the fine powder capturing apparatus 26.

In the production method of the present invention, a material of the membrane 52 is not especially limited, and, in view of being capable of easy shaking off the fine powders (superior in dust release) captured at the surface of the membrane 52, it is particularly preferable to be polytetrafluoroethylene. The membrane filter 50 provided with this membrane 52 made of polytetrafluoroethylene can contribute to enhancement of trapping efficiency of the fine powders by this fine powder capturing apparatus 26. Such a membrane filter 50 can reduce running cost further. The production method of the present invention is superior in productivity. In the production method of the present invention, because the fine powders are removed efficiently from the particulate water-absorbing agent, the particulate water-absorbing agent superior in properties such as absorbency against pressure, liquid permeability, or the like can be obtained. In this production method, it is preferable that number average molecular weight of polytetrafluoroethylene is 1000000 to 10000000.

As described above, in the production method of the present invention, the polyvalent metal salt, the inorganic particle and the liquid permeability improver may be formulated to the particulate water-absorbing agent, in the surface cross-linking step or the cooling step. This formulation prevents blocking of the particulate water-absorbing agent, and enhances liquid permeability and hygroscopic fluidity. Also in this case, because the membrane 52 of the membrane filter 50 can capture the fine powders at the surface thereof, intrusion of the fine powders into the inside of the membrane filter 50 can be suppressed. This membrane filter 50 is superior in durability. By use of this membrane filter 50, exchange frequency of the trapping material 40 in the fine powder capturing apparatus 26 can be reduced further. Therefore, this membrane filter 50 can reduce running cost. The production method of the present invention is superior in productivity. This production method can become more effective, in particular, in the particulate water-absorbing agent containing the polyvalent metal salt, the inorganic particle or the like.

[The Granulation Step]

The granulation step is the step for obtaining the granulated particle by adding an aqueous liquid to the fine powders. The fine powders collected at the collection step, the fine powders classified by the classification step, and the fine powders sized by the granule sizing step are supplied to this granulation step. In this production method, it is preferable that all of the fine powders collected by the collection step are supplied to this granulation step. In this production method, the granulated particle is composed of a plurality of the fine powders. Weight average particle diameter of the granulated particle is equal to or smaller than 20 mm, preferably 0.3 to 10 mm, and more preferably 0.35 to 5 mm. In this production method, the granulated particle obtained by the granulation step is charged to any of the steps. In view of production efficiency, it is preferable that this granulated particle is charged to the drying step and dried in the co-presence of the polymer gel. As shown in FIG. 1, in this production apparatus 2, the second pipeline 6b jointed to the fine powder capturing apparatus 26 is jointed to the granulation apparatus 28. This fine powder capturing apparatus 26 is jointed to the drying apparatus 10 by the pipeline 6. In this production method, the fine powders discharged from the fine powder capturing apparatus 26 are charged to the granulation apparatus 28 through the second pipeline 6b. The granulated particle formed in this granulation apparatus 28 is charged to the drying apparatus 10 through the pipeline 6. In this production apparatus 2, the granulation apparatus 28 is jointed to the classification apparatus 14. This granulation apparatus 28 is also jointed to the granule sizing apparatus 28. This production apparatus 2 is configured so that the fine powders classified in the classification step and the fine powders selected by the granule sizing step are charged to this granulation apparatus 28. It should be noted that, this granulation step may not be performed, when amount of the fine powders generating is low. This granulation step is the step which may be included further in this production method, as needed, and there may be the case where it is not performed.

In this granulation step, it can be confirmed that a granulated substance generated is the granulated particle from the fact that a plurality of individual particles gather together while maintaining shape thereof and aggregates, or from the fact that they swell as a plurality of discontinuous particles in absorbing a solution, with an optical microscope.

In this granulation step, in view of drying load, the granulated particle has a water content of preferably equal to or lower than 75% by weight, more preferably equal to or lower than 70% by weight, and further preferably equal to or lower than 65% by weight (the lower limit is over 0% by weight, and preferably equal to or higher than 5% by weight). When the water content of the granulated particle is extremely higher than that of the polymer gel, drying could be partially incomplete when this granulated particle and the polymer gel are dried in a co-present state.

In this granulation step, the aqueous liquid may be one where the additive is dissolved in a solvent. This additive is at least one kind of additive selected from a group consisting of a thermal decomposition-type radical polymerization initiator, an oxidizing agent and a reducing agent to decrease amount of a residual monomer. A solvent of the aqueous liquid is not especially limited and, for example, water, an aqueous solution containing a hydrophilic organic solvent (for example, lower alcohols such as methyl alcohol, ethyl alcohol, n-propyl alcohol, isopropyl alcohol, n-butyl alcohol, isobutyl alcohol, t-butyl alcohol, or the like; ketones such as acetone, or the like; ethers such as dioxane, tetrahydrofuran, or the like; amides such as N,N-dimethylformamide, or the like; sulfoxides such as dimethylsulfoxide or the like) is included. From a view of property or granulation strength, it is desirable that the aqueous liquid contains water preferably in 90 to 100% by weight, and more preferably in 99 to 100% by weight, and is particularly preferably composed of only water. In addition, other additives such as a cross-linking agent, a chelating agent, a surfactant, or the like may be contained in the aqueous liquid in small amount within a range not to impair effect of the present invention. For example, as the cross-linking agent, the cross-linking agent as described above may be used. By containing the cross-linking agent in the aqueous liquid, reduction of water-soluble components, or enhancement of granulation strength can be expected.

In this granulation step, as the thermal decomposition-type radical polymerization initiator which can be used as the additive, the thermal decomposition-type initiator exemplified in the polymerization step may be used preferably in a similar way. Among these, a peroxide is preferable, and a persulfate salt such as sodium persulfate is particularly preferable. These thermal decomposition-type radical polymerization initiators may be only one or two or more kinds. The oxidizing agent is not especially limited as long as it can react with the monomer, while drying the granulated particle and the polymer gel in a co-present state. As this oxidizing agent, for example, an inorganic oxidizing agent such as a chlorate salt, a bromate salt, a chlorite salt, a hypochlorite salt, or the like; the persulfate salt or hydrogen peroxide exemplified also as the thermal decomposition-type radical polymerization initiator; an inorganic peroxide or an organic peroxide such as t-butyl peroxide, benzoyl peroxide, or the like; or the like is included. Among these, the persulfate salt or hydrogen peroxide is preferable, and the persulfate salt is particularly preferable. These oxidizing agents may be only one or two or more kinds. The reducing agent is not especially limited, and may be an organic reducing agent or an inorganic reducing agent. As this reducing agent, the inorganic reducing agent is preferable, and a sulfur-type, a phosphorous-type, or a nitrogen-type reducing agent is particularly preferable. Specifically, the reducing agent exemplified in the polymerization step may be used preferably in a similar way. Among these, the sulfur-type reducing agent, in particular, a sulfite salt, a hydrogen sulfite salt, a pyrosulfite salt, or a dithionite salt is preferable, and as a salt thereof, a sodium salt, a potassium salt, or an ammonium salt is preferable. Among these, sodium sulfite or sodium hydrogen sulfite is particularly preferable. These reducing agents may be only one or two or more kinds. As this additive, among those described above, the thermal decomposition-type radical polymerization initiator is preferable, and in particular, use of the persulfate salt as the additive is preferable in view of exerting superior reducing effect of the residual monomer.

In this granulation step, content of the additive in the aqueous liquid is not especially limited, and, it is preferably 0.0001 to 1% by weight, relative to the fine powders. The content below 0.0001% by weight could not decrease the residual monomer sufficiently, while the content over 1% by weight could generate coloring in the final particulate water-absorbing agent obtained after drying.

In this granulation step, use amount of the aqueous liquid is not especially limited, and, from 25 parts by weight to 280 parts by weight, relative to 100 parts by weight of the fine powders is preferable. More preferably, it is equal to or lower than 200 parts by weight, and further preferably, it is equal to or lower than 150 parts by weight. The use content of the aqueous liquid of over 280 parts by weight results in providing a unified giant gel-like substance with high water content, and thus it becomes difficult to dry and pulverize this gel-like substance. In particular, it requires tremendous load in drying. On the other hand, when the use amount of the aqueous liquid is less than 25 parts by weight, granulation strength becomes insufficient, and could not exert superior characteristics in a final product as well as make mixing inhomogeneous and therefore make granulation difficult.

In this granulation step, when the fine powders are granulated, it is enough to mix the fine powders and the aqueous liquid, but, in particular, in the granulation, it is preferable that the aqueous liquid is heated in advance, and further it is a preferable aspect that granulation is performed by high speed mixing of the aqueous liquid heated and the fine powders. In this way, the granulated particle with directly controlled particle diameter can be obtained without making the unified giant gel-like substance. As a result, it becomes easy to further dry and pulverize the gel-like substance to obtain the granulated particle, and thus a problem caused when the unified giant gel-like substance is obtained, that is, a problem that since force required for mixing becomes enormous, or the gel-like substance is kneaded in a bulk state, generation of scission or entanglement of a main chain causes deterioration of the particulate water-absorbing agent itself.

In this granulation step, in a preferable aspect of the granulation, temperature in heating the aqueous liquid is usually equal to or higher than 40° C., preferably equal to or higher than 50° C., more preferably equal to or higher than 60° C., and further preferably equal to or higher than 70° C. In addition, the upper limit of this temperature is equal to or lower than boiling point of the aqueous liquid, and the boiling point may be adjusted variously by adding salts or other solvents, or by changing pressure (reduced pressure, pressurization) or the like. Because there is no big change even when the temperature is over 100° C., heating of the aqueous liquid is performed usually at equal to or lower than 100° C. It should be noted that, when the aqueous liquid is heated in advance, it is preferable that the additive is made separately as the aqueous liquid with relatively high concentration at room temperature or under cooling, and then this aqueous liquid is mixed with a relatively large quantity of the residual part of the aqueous liquid, which has been heated in advance, just before mixing with the fine powders.

In this granulation step, in a preferable aspect of the granulation, it is preferable that the aqueous liquid is heated in advance, and further the fine powders themselves are heated in advance. Temperature in heating this fine powders is also usually equal to or higher than 40° C., and preferably equal to or higher than 50° C. Because there is no big change even when the temperature is over 100° C., heating of the fine powders is performed usually at equal to or lower than 100° C. It should be noted that, when the fine powders themselves are heated in advance, means thereof is not especially limited, and for example, they may be heated by drying and then retaining heat, or they may be heated separately from outside.

In this granulation step, in a preferable aspect of the granulation, the aqueous liquid and the fine powders heated are subjected to high speed mixing. High speed mixing means that time for completing mixing of the aqueous liquid and the fine powders, and then forming the granulated particle is short time. That is, it means that time from the point when the aqueous liquid and the fine powders contact to the point when the granulated particle forms, in other word, mixing time is short time. This mixing time is preferably equal to or shorter than 3 minutes, more preferably equal to or shorter than 1 minute, and most preferably 1 second to 60 seconds. When mixing time is longer, uniform mixing of the aqueous liquid and the fine powders becomes difficult, and it tends to provide the unified giant gel-like substance. In addition, when mixing time is longer, the additives contained in the aqueous liquid may decompose before the granulated particle generated and the polymer gel together are supplied to the drying step, and sufficient amount of the additive might not be present in the drying step. Further, continuing mixing for a long time could incur decrease in performance of the particulate water-absorbing agent, such as increase in water-soluble components or decrease in absorbency against pressure of the particulate water-absorbing agent obtained after completion of mixing.

It should be noted that, amount of the granulated particle to be used in recycling the granulated particle is preferably to 40% by weight and more preferably 10 to 30% by weight, relative to the polymer gel (100% by weight) obtained by the polymerization step.

(The Particulate Water-Absorbing Agent)

Weight average particle diameter (D50) specified by JIS standard sieve classification of the particulate water-absorbing agent obtained by the production method of the present invention, is preferably 200 to 800 μm, more preferably 200 to 450 μm, more preferably 220 to 430 μm, and further preferably 250 to 400 μm. In addition, the particulate water-absorbing agent of the present invention can exert effect most, when it has specific particle diameter distribution. As for the preferable particle diameter distribution, particles occupying within the upper and the lower limit of 850 to 150 μm (specified by the JIS standard sieve; Z8801-1 (2000)), that is, ratio of particles having the weight average particle diameter (D50) of 150 to 850 μm, is preferably 90 to 100% by weight, further preferably 95 to 100% by weight, and particularly preferably from 98 to 100% by weight, relative to total of the water-absorbing agent. And, a substance passing 150 μm, that is, content of the fine powders having the weight average particle diameter of below 150 μm contained in the particulate water-absorbing agent, is preferably 0 to 5% by weight, more preferably 0 to 1% by weight, and further preferably from 0 to 0.5% by weight, relative to total weight of the particulate water-absorbing agent. The particle diameter distribution is preferably in a specific range. Logarithm standard deviation (σζ) thereof is set to preferably 0.20 to 0.50, and further preferably 0.30 to 0.40. When the weight average particle diameter (D50), the content rate of particles below 150 μm, and the logarithm standard deviation (σζ) of particle diameter are outside the range, liquid permeability and water absorbing speed might decrease. It should be noted that, the logarithm standard deviation and the weight average particle diameter are specified by the specification of US-A-2006/0204755.

It should be noted that, particle shape of the particulate water-absorbing agent or the particulate water-absorbing resin relevant to the present invention is not especially limited. As this particle shape, spherical-shape, nearly spherical-shape, irregular pulverized shaped (which is a pulverized substance), bar shape, polygonal shape, sausage shape (for example; U.S. Pat. No. 4,973,632), a particle with wrinkles (for example; U.S. Pat. No. 5,744,564) or the like is included. They may be a single particle, or a granulated particle or a mixture of the single particle and the granulated particle. In addition, the particle may be foamed porous one. Preferably, a single particle with irregular pulverized shaped shape or a granulated substance thereof is included.

Because the production method of the present invention includes the collection step, the particulate water-absorbing agent can be produced continuously and stably. The production method of the present invention is superior in trapping efficiency of the fine powders. Such a production method can contribute to stabilization of water absorbing characteristics of a product obtained continuously, while maintaining superior trapping efficiency of the fine powders, in a production scale of preferably equal to or higher than 500 kg/h, further preferably equal to or higher than 1000 kg/h, and particularly preferably equal to or higher than 1500 kg/h (the upper limit is 10000 kg/h). The production method of the present invention can become more effective, when the fine powders in a range of equal to or lower than 10% of total production amount can be collected. The production method of the present invention can become further effective, when the fine powders in a range of equal to or lower than 5% of total production amount can be collected. The production method of the present invention can become particularly effective when the fine powders in a range of equal to or lower than 3% of total production amount can be collected.

Amount of the residual monomer of the particulate water-absorbing agent obtained by the production method of the present invention is preferably equal to or lower than 500 ppm. By setting the amount of this residual monomer at equal to or lower than 500 ppm, when the particulate water-absorbing agent contained in absorbent articles such as disposable diapers absorbs practically human urine and swells, malodor emitted from this particulate water-absorbing agent, and influence to a skin of a user contacted to this particulate water-absorbing agent are suppressed. The absorbent articles containing this particulate water-absorbing agent is superior in a hygiene aspect. In a production floor of the absorbent articles, even if this particulate water-absorbing agent scatters, influence to health of a worker caused by this residual monomer is suppressed. From this viewpoint, as the amount of this residual monomer, amount equal to or lower than 400 ppm is preferable, amount equal to or lower than 300 ppm is more preferable, amount equal to or lower than 250 ppm is more preferable, amount equal to or lower than 200 ppm is more preferable, amount equal to or lower than 150 ppm is further preferable, and amount equal to or lower than 100 ppm is particularly preferable. When a principal component of the monomer used in the polymerization is acrylic acid and/or a salt thereof, it is preferable that content of the unreacted acrylic acid and/or the salt thereof is equal to or less than 500 ppm.

In measurement of amount of the residual monomer, 0.5 g of the particulate water-absorbing agent is added to 1000 g of deionized water in a plastic container having a cap, and stirred for 2 hours. After stirring, the swelled and gelled particulate water-absorbing agent is filtered with a filter paper, and a filtrate is analyzed with liquid chromatography. On the other hand, solutions of the monomer (acrylic acid) with known concentrations are similarly analyzed, and the resultant calibration curve is used as an external standard. Based on this external standard, amount of the residual monomer is determined in consideration of dilution rate of a filtrate.

As described above, in the production method of the present invention, the fine powders can be removed efficiently from the particulate water-absorbing agent. According to the production method of the present invention, the particulate water-absorbing agent with less fine powders can be obtained.

Amount of dust (AD) of the particulate water-absorbing agent obtained by the production method of the present invention is preferably equal to or lower than 300 ppm. As will be described later, the particulate water-absorbing agent with low amount of dust (AD) is superior in properties such as absorbency against non-pressure, absorbency against pressure, liquid permeability, or the like. From this viewpoint, this amount of dust (AD) is preferably equal to or lower than 100 ppm, and further preferably equal to or lower than 70 ppm. It should be noted that, such a particulate water-absorbing agent contains the additive (in particular, the polyvalent metal oxide or the inorganic particle), however, powder and dust (AD) derived from the additive is lower than a conventional one.

As described above, the present invention provides a novel particulate water-absorbing agent having the following properties, which is composed principally of surface cross-linked polyacrylic acid (salt) based water-absorbing resin, in particular, the irregular pulverized shaped particulate water-absorbing agent. In addition, one having the following properties exerts effect of the present invention significantly.

Absorbency against non-pressure (CRC) for a normal saline solution, of the particulate water-absorbing agent obtainable by the production method of the present invention is preferably 10 to 100 g/g, more preferably 20 to 60 g/g, and particularly preferably 25 to 50 g/g.

The particulate water-absorbing agent obtainable by the production method of the present invention has Absorbency against Pressure (AAP) for a normal saline solution under pressure of 4.8 kPa, of preferably 15 to 50 g/g, more preferably 18 to 45 g/g, and particularly preferably 20 to 35 g/g.

As described above, amount of the fine powders, contained in the particulate water-absorbing agent obtainable by the production method of the present invention, is low. In such a particulate water-absorbing agent, obstruction of liquid permeability caused by the fine powders is suppressed. This particulate water-absorbing agent is superior in liquid permeability. Therefore, the production method of the present invention is desirable as the production method of the particulate water-absorbing agent requiring particularly high liquid permeability (SFC).

Saline flow conductivity (SFC) of the particulate water-absorbing agent obtainable by the production method of the present invention is a value representing liquid permeation on swelling of the particulate water-absorbing agent or the water-absorbing agent. This saline flow conductivity is also called liquid permeability. The larger is the value of this saline flow conductivity (SFC), the particulate water-absorbing agent has the higher liquid permeation. This saline flow conductivity (SFC) is preferably equal to or higher than 1 ($\times 10^{-7} \cdot cm^3 \cdot s \cdot g^{-1}$), more preferably 20 to 1000, and particularly preferably 30 to 500. In the absorbent articles containing such a particulate water-absorbing agent, even when concentration of the particulate water-absorbing agent contained in the articles is equal to or higher than 30% by mass and more specifically equal to or higher than 50% by mass, absorption speed of urine is maintained suitably, and generation of leakage is also suppressed.

The absorbent articles such as disposable diapers, where the particulate water-absorbing agent, having CRC, AAP and SFC in the above range, is used, absorb body fluid or the like well. Because these properties, CRC/AAP/SFC, are conflicting properties, it is necessary that properties of the particulate water-absorbing agent are adjusted so as to take balance in a required range.

In the production method of the present invention, in view of stably maintaining superior properties of the particulate water-absorbing agent, as well as preventing blocking, it is preferable that dried gas is passed in any of the steps. As this gas, one having a dew point of equal to or lower than −15° C. is preferable, one having equal to or lower than −20° C. is more preferable, and one having equal to or lower than −30° C. is particularly preferable. When it is difficult to pass dried gas, it is preferable that heated gas is passed. The lower limit of this due point is −80° C. A heating method is not especially limited, and, the gas may be heated directly by use of a heat source, and the gas to be passed may be heated indirectly by heating the apparatuses 4, the pipelines 6 or the like installed between each of the steps. Temperature of this heated gas is preferably equal to or higher than 30° C., more preferably equal to or higher than 50° C., and further preferably equal to or higher than 70° C.

In the production method of the present invention, pressure in the apparatuses 4, the pipelines 6 or the like, where the steps are performed, may be set lower than atmospheric pressure. Setting in a reduced pressure state can suppress leakage of the fine powders from the apparatuses 4, the pipelines 6 or the like. The reduced pressure state can contribute to increase of trapping efficiency of the fine powders generating in producing the particulate water-absorbing agent. In the production method of the present invention, because the fine powders are removed efficiently from the particulate water-absorbing agent, the particulate water-absorbing agent superior in properties such as absorbency against pressure, saline flow conductivity, or the like can be obtained. The degree of reduced pressure is not especially limited, but, the lower limit of the degree of reduced pressure is preferably in a range of 0 to 10 kPa, and more preferably in a range of 0.01 to 5 kPa. It should be noted that, "the degree of reduced pressure" in the present invention means pressure difference from atmospheric pressure, and when atmospheric pressure is standard atmospheric pressure (101.3 kPa), "the degree of reduced pressure of 10 kPa" means that gas pressure is 91.3 kPa.

In the production method of the present invention, pressure in the apparatuses 4, the pipelines 6 or the like, where the steps are performed, may be set higher than atmospheric pressure. Setting in a pressurized state can prevent intrusion of grit and dust or the like into the apparatuses 4, the pipelines 6 or the like. The pressurized state can contribute to reducing amount of foreign materials contained in the particulate water-absorbing agent. By maintaining each step in a pressurized state, the particulate water-absorbing agent with high quality can be obtained. This pressurized condition can contribute to transportation of the fine powders toward the trapping material 40 of the fine powder capturing apparatus 26. Even in this case, the trapping material 40 of the fine powder capturing apparatus 26 can capture the fine powders effectively. Because the fine powders are removed efficiently from the particulate water-absorbing agent, the particulate water-absorbing agent superior in properties such as absorbency against pressure, saline flow conductivity, or the like can be obtained. The degree of pressurization is not especially limited, butr, the lower limit of the degree of pressurization is preferably in a range of 0 to 1 MPa, and more preferably in a range of 0.01 kPa to 0.6 MPa. It should be noted that, "the degree of pressurization" in the present invention means pressure difference from atmospheric pressure, and when atmospheric pressure is standard atmospheric pressure (101.3 kPa), "the degree of pressurization of 10 kPa" means that gas pressure is 111.3 kPa.

As described above, in the production method of the present invention, because the fine powders generating in production process can be collected efficiently, while preventing scattering, the particulate water-absorbing agent superior in properties can be obtained. That is, in the method for producing the water-absorbing resin of the present invention, good work environment can be maintained. Further, in the production method of the present invention, because the fine powders are removed efficiently from the particulate water-absorbing agent, the particulate water-absorbing agent superior in properties such as absorbency against pressure, saline flow conductivity, or the like can be obtained. In addition, because this production method is superior in trapping efficiency of the fine powders, by effective reuse of the fine powders thus collected, effect in view of production cost, that is, reuse of the fine powders, can be obtained as well.

EXAMPLES

Effect of the present invention will be clarified below with reference to Examples, but, the present invention should not be construed restrictively, based on description of these Examples. It should be noted that, in the present description, "parts by mass" and "% by mass" are synonymous to "% by mass" and "% by weight", respectively.
(Measurement of Amount of Dust)

In the present invention, amount of dust (AD) of the particulate water-absorbing agent is obtained by measuring amount of a captured substance captured on a glass fiber filter paper by suction for predetermined time, by use of "Heubach DUSTMETER" (product name), manufactured by Heubach Engineering GmbH (Germany). This measurement is performed by setting a measurement mode of the dust meter to Type I, at a temperature of 25° C.±2° C., in a relative humidity of 20 to 40% under atmospheric pressure. In detail, this amount of dust (AD) is obtained as follows. Firstly, the particulate water-absorbing agent produced (100.00 g) is put in a rotating drum. Next, mass Da of the glass fiber filter paper having a retention particle diameter (JIS P3801) of 0.5 µm, and a diameter of 50 nm, (for example, a product name "GLASS FIBER GC-90" manufactured by ADVANTEC Co. Ltd., or an equivalent product thereof) is measured in a unit of down to 0.00001 g. Next, a filter case mounted with the glass fiber filter paper is attached to the rotating drum. Next, the dust meter is operated for 30 minutes under condition of a drum rotation number of 30 rpm, and a suction air volume of 20 L/min. Next, mass Db of the glass fiber filter paper after completion of the operation is measured in a unit of down to 0.00001 g. By using these masses Da and Db measured, amount of dust (AD) is calculated according to the following expression.

AD (ppm)=(Db−Da)/100.00×1000000 [Expression 2]

As will be described later, as for amount of filter permeation dust (PD) through the filter, of the particulate water-absorbing agent obtained by the production method of the present invention, the lower is the better, and 0 ppm is particularly preferable. As will be described later, when the PD amount is low, because the fine powders do not intrude into the inside of the filter, the fine powders attached at the outside of the filter are removed easily by physical impact (preferably, wave pulse of air) in shaking off. In addition, because trapping efficiency of the filter can be maintained by the collection method and the production method of the present invention, exchange frequency of the filter is reduced. Further deterioration of work environment, caused by scattering of the fine powders in the exchange, is also prevented.
(Measurement of Amount of Permeation Dust)

Figure 6:
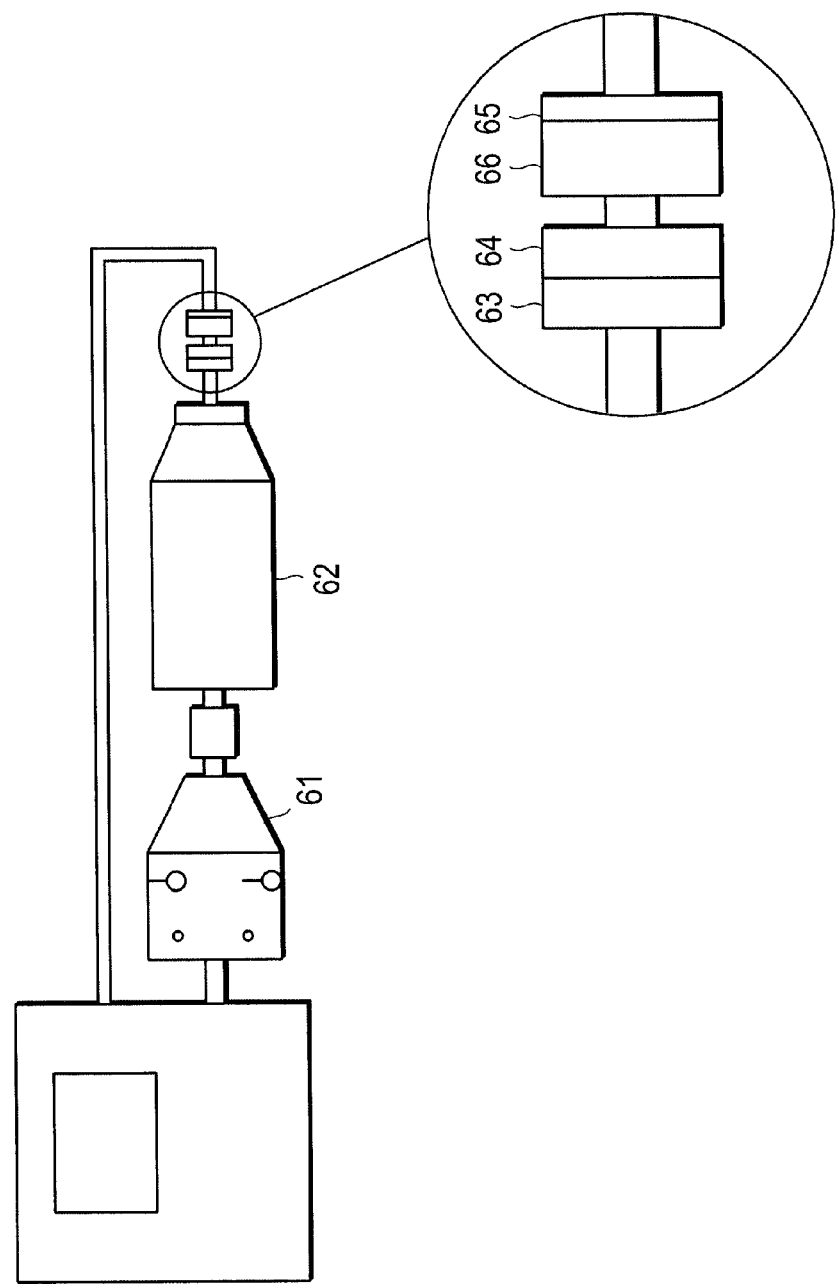
FIG. 6 is a side view of a measurement apparatus of amount of dust permeation.

In the present invention, amount of filter permeation dust (PD) through the filter, of the particulate water-absorbing agent is obtained by measuring amount of captured substance captured on the filter and the glass fiber filter paper by suction for predetermined time, by use of "Heubach DUSTMETER", product name, (refer to FIG. 6), manufactured by Heubach Engineering GmbH (Germany). This measurement is performed by setting a measurement mode of the dust meter to Type I, at a temperature of 25° C.±2° C., in a relative humidity of 20 to 40% under atmospheric pressure. In detail, amount of filter permeation dust (PD) is obtained as follows.

Firstly, the particulate water-absorbing agent produced (100.00 g) is put in a rotating drum 61. Next, a glass bottle 62 is mounted to the rotating drum 61. Next, a filter case 64 mounted with a filter (a membrane filter or a nonwoven fabric or the like) 63, which is weighed in a unit of down to 0.00001 g (mass in this case is Pa), is attached at the backward of a glass bottle 62. At the backward of the filter case 64, a filter 66 provided with the glass fiber filter paper 65 having a retention particle diameter (JIS P3801) of 0.5 µm, and a diameter of 50 nm (for example, a product name "GLASS FIBER GC-90", manufactured by ADVANTEC Co. Ltd., or an equivalent product thereof) is attached. It should be noted that, mass Da of the glass fiber filter paper 65 is measured in a unit of down to 0.00001 g. Next, the dust meter is operated for 30 minutes under condition of a drum rotation number of 30 rpm, and a suction air volume of 20 L/min. After completion of the operation, mass Db of the glass fiber filter paper, and filter attachment mass Pb are measured in a unit of down to 0.00001 g. By using these masses Da, Db, Pa, Pb measured, amount of filter permeation dust (PD) is calculated according to the following expression.

PD (ppm)=(Db−Da)/[(Db−Da)+(Pb−Pa)]×1000000 [Expression 3]

(Measurement of CRC)

In measurement of absorbency against non-pressure (CRC), about 0.2 g of the particulate water-absorbing agent is prepared. Mass W1 of this particulate water-absorbing agent is measured. This particulate water-absorbing agent is put uniformly in a bag made of nonwoven fabric (60 mm×85 mm). This bag is immersed in a normal saline solution (about 200 g) with a temperature adjusted at 25±2° C. Next, this bag is pulled up, and put in a centrifugal separation apparatus (a compact-type centrifugal separation apparatus, model-type: H-122, manufactured by Kokusan Co., Ltd.). This centrifugal separation apparatus is operated for 3 minutes, under a condition of 250 G (250×9.81 m/s$^2$). Mass W2 (g) of the bag after that is measured. On the other hand, similar operation is performed on the bag without containing the particulate water-absorbing agent, and mass W3 (g) thereof is measured. Absorbency against non-pressure (CRC) is calculated according to the following expression.

CRC (g/g)=[(W2−W3)/W1]−1 [Expression 4]

(Measurement of AAP)

In measurement of absorbency against pressure (AAP), a supporting cylinder made of plastic having an inner diameter of 60 mm, is prepared. At the bottom of this supporting cylinder, a metal mesh made of stainless steel is welded. This metal mesh has a mesh number of 400 mesh (a sieve mesh size of 38 µm). On the other hand, a piston (cover plate) having an outer diameter of a little smaller than 60 mm, and having no clearance between the wall surface of the supporting cylinder and itself, and being able to slide up and down, is also prepared. On the metal mesh, the water-absorbing agent with a mass of W4 (specifically, about 0.900 g) is spread uniformly. On this water-absorbing agent, the piston is mounted to measure mass W5 (g) of the water-absorbing agent and the piston. By mounting a weight on this piston, a pressure of 4.8 kPa (50 g/cm$^2$) is uniformly loaded to the water-absorbing agent. Inside a Petri dish with a diameter of 150 mm, a glass filter with a diameter of 90 mm, and a thickness of 5 mm is put. Into the Petri dish, a normal saline solution, whose temperature is adjusted to 25±2° C., is poured, so as to become the same level as the upper surface of the glass filter. On the upper surface of this glass filter, one sheet of a filter paper with a diameter of 9 cm (No. 2, manufactured by Toyo Roshi Kaisha, Ltd.) is put. All the surface of this filter paper is wet with the saline solution. After that excess saline solution is removed. The supporting cylinder and the piston were put on the Petri dish so that the metal mesh contacts with this filter paper. The water-absorbing agent absorbs the saline solution under pressure. When water surface of the saline solution becomes lower than the upper surface of the glass filter, the saline solution is replenished to maintain the water surface level to be constant. After one hour, the supporting cylinder and the piston are picked up from the Petri dish to measure mass W6 (g) excluding the weight. This mass W6 (g) includes mass of the water-absorbing agent swollen by the saline solution. Absorbency against pressure (AAP) is calculated according to the following expression.

$$AAP\ (g/g)=(W6-W5)/W4 \quad \text{[Expression 5]}$$

It should be noted that, the measurement is performed under an environment of 23±2° C. Such a measurement method has been disclosed in U.S. Pat. No. 6,071,976.

(Measurement of SFC)

In measurement of saline flow conductivity (SFC), 0.900 g of the water-absorbing agent is put uniformly in a container. This water-absorbing agent is pressurized at 2.07 kPa, while being immersed into artificial urine. After 60 minutes, height of the swollen water-absorbing agent (gel layer) is recorded. In a state that the water-absorbing agent is pressurized at 2.07 kPa, a 0.69% by weight normal saline solution is passed through the gel layer. Room temperature in this case is adjusted at 20° C. to 25° C. By use of a computer and a balance, fluid amount passing through the gel layer is recorded in an interval of 20 seconds to calculate flow velocity Fs (T) of the fluid passing. Flow velocity Fs (T) is calculated by dividing increased mass (g) by increased time (s). Time when hydrostatic pressure of the saline solution became constant and stable flow velocity is obtained, is adopted as Ts, and only data measured for 10 minutes from the Ts is used in flow velocity calculation. From flow velocity measured for 10 minutes from the Ts, value of Fs (T=0) is obtained. This value is initial flow velocity for passing through the gel layer. Fs (T) is plotted against time, and Fs (T=0) is calculated based on the result obtained by the least square method. Saline flow conductivity (SFC) is calculated according to the following expression.

$$SFC=(Fs(t=0)\cdot L0)/(\rho\cdot A\cdot \Delta P) \quad \text{[Expression 6]}$$

In this expression, L0 is height (cm) of the gel layer, ρ is density (g/cm$^3$) of the saline solution, A is cross-sectional area A (cm$^2$) of the gel layer and ΔP is hydrostatic pressure (dyne/cm$^2$) loaded on the gel layer. The artificial urine is obtained by mixing 0.25 g of a dehydrate of calcium chloride, 2.0 g of potassium chloride, 0.50 g of a hepta-hydrate of magnesium chloride, 2.0 g of sodium sulfate, 0.85 g of ammonium dihydrogen phosphate, 0.15 g of diammonium hydrogen phosphate, and 994.25 g of pure water. Such an evaluation is performed in accordance with the SFC test described in U.S. Pat. No. 5,849,405.

Example 1

In a production apparatus of FIG. 1, the particulate water-absorbing agent (150000 kg) was produced continuously. This production apparatus has capability of producing the particulate water-absorbing agent in 1500 kg/hr. It should be noted that, the first pipeline jointed to the fine powder capturing apparatus was connected to the positions shown by S6, S7, S10, S12, S14 and S16, among positions shown by the arrow lines S1 to S20 in FIG. 1, in a reduced pressure state. Degree of reduced pressure differs somewhat depending on parts jointed, however, it was set in a range of −20 to −40 mmAq (=reduced pressure of 0.196 to 0.392 kPa) (gauge pressure). The apparatuses and pipelines other than the above-described one were set in normal pressure. The second pipeline 6b, which is jointed to the fine powder capturing apparatus, was jointed to a granulation apparatus. This granulation apparatus was jointed to a pipeline connecting a polymerization apparatus and a drying apparatus. In this production apparatus, the fine powders contained in gas of each step were collected by this fine powder capturing apparatus through the first pipeline (the collection step). The fine powders collected were charged to the granulation apparatus through the second pipeline. In this production apparatus, a classification apparatus and the granulation apparatus are jointed by a pipeline, and the fine powders classified by this classification apparatus were put to the granulation apparatus through the pipeline. A granule sizing apparatus and the granulation apparatus are jointed by a pipeline, and the fine powders classified by this granule sizing apparatus were charged to the granulation apparatus through this pipeline. In this granulation apparatus, granulated particles obtained from the fine powders were put to the drying step.

In this Example 1, firstly an aqueous solution containing a partial sodium salt of acrylic acid with 75% by mole neutralized, as a monomer, and polyethylene glycol diacrylate (average addition mole number, "n", of ethylene oxide, represented by average number of polymerization degree of an ethylene chain in the polyethylene glycol chain, is 9) as an internal cross-linking agent, was prepared as a monomer solution. In this monomer solution, monomer concentration was adjusted to 38% by weight. Concentration of the internal cross-linking agent was adjusted to 0.06% by mole, relative to the monomer.

Next, while this monomer solution is fed continuously with a metering pump, by blowing nitrogen gas continuously, oxygen concentration of this monomer solution was adjusted to equal to or lower than 0.5 ppm. Next, sodium persulfate and L-ascorbic acid were mixed into the monomer solution with line-mixing, so that mass of sodium persulfate/L-ascorbic acid became 0.14 g/0.005 g, relative to 1 mole of the monomer.

Next, the monomer solution was supplied to a flat surface steel belt having weirs at both sides thereof, so that thickness thereof became about 25 mm, and aqueous solution polymerization was performed at 95° C. for 30 minutes to obtain polymer gel in a water-containing state (the polymerization step).

Next, this polymer gel was pulverized, and further this pulverized polymer gel was segmentalized to about 1 mm by use of a meat chopper with a pore diameter of 7 mm. This was spread thinly and mounted on the porous plate of a band dryer, to be subjected to hot air drying at 180° C. for 30 minutes, and the particulate water-absorbing resin as a dried substance of the polymer gel was obtained (the drying step).

Next, this dried substance was pulverized to obtain a particulate dried substance. Whole mass of this particulate dried substance was continuously supplied to a three-stage roll mill (roll gap configuration: from the top, 1.0 mm/0.55 mm/0.42 mm) to be pulverized further (the pulverization step).

After this, it was classified by use of a classification apparatus having a metal sieve with a sieve mesh size of 850 μm, and a metal sieve with a sieve mesh size of 150 μm (the classification step) to obtain the particulate water-absorbing resin. About 98% by mass of this particulate water-absorbing resin is the particulate water-absorbing resin with particle diameter of 150 μm to 850 μm. It should be noted that, absorbency against non-pressure (CRC) of this particulate water-absorbing resin was 35 g/g.

Next, a surface cross-linking agent solution was prepared. This surface cross-linking agent solution was composed of 1,4-butanediol, propylene glycol and pure water. 1,4-butanediol, propylene glycol and pure water were adjusted so as to be 0.30 part by mass, 0.50 part by mass and 2.70 part by mass, respectively, relative to 100 parts by mass of the particulate water-absorbing resin. Next, this particulate water-absorbing resin was continuously supplied in 1000 kg/h to a high speed continuous mixing machine (Turbulizer™/1000 rpm), and the surface cross-linking agent solution was sprayed with a sprayer to mix this surface cross-linking agent solution and the particulate water-absorbing resin. Next, the particulate water-absorbing resin mixed with this surface cross-linking agent solution was heated for 40 minutes with a paddle dryer adjusted at 200° C. (the surface cross-linking step).

After this, it is cooled to 60° C. by use of a paddle dryer (a groove-type stirring dryer) (the cooling step).

After cooling (the cooling step), it was classified by use of the metal sieve with a sieve mesh size of 850 μm, and the metal sieve with a sieve mesh size of 150 μm to obtain the particulate water-absorbing agent 1 as a product having a particle diameter of 150 μm to 850 μm (the granule sizing step).

This particulate water-absorbing agent 1 was supplied to the packaging step via the pneumatic transportation step. Because compressed air was used in the pneumatic transportation, a pressurized condition (pressure: 0.5 MPa) was maintained in a transportation pipeline. This particulate water-absorbing agent 1 was put in a packaging material container (the packaging step).

It should be noted that, the particulate water-absorbing agent with a particle diameter of equal to or larger than 850 μm, obtained by classification, was pulverized again and then classified. It should be noted that, the particulate water-absorbing agent with a particle diameter of equal to or smaller than 150 μm was collected by the fine powder capturing apparatus provided with a filter, along with the fine powders contained in gas inside each of the steps, granulated and then charged to the drying step.

In addition, as the fine powder capturing apparatus 26, the fine powder capturing apparatus provided with five trapping materials inside, shown in FIG. 2 to FIG. 4, was used. As the trapping material, a bag filter (trapping efficiency: 99.9%) composed of a membrane (material: polytetrafluoroethylene with number average molecular weight: 1000000 to 10000000, a thickness: 0.02 mm, pore diameter: 2.5 μm) and a substrate (material: polyester, thickness: 2.3 mm, and pore diameter: 50 μm) was used. Linear velocity (permeation flux) of gas (kind: air) passing through the surface of the trapping material 40 was 1.3 m/min, and temperature of the trapping material was set at 80° C. In addition, the fine powders attached onto the membrane was shaken off by adding wave pulse (physical impact) of air.

It should be noted that, in the granulation step, as the aqueous liquid, 110 parts by weight of warm water, relative to 100 parts by weight of the fine powders, was used to be subjected to high speed continuous mixing for 0.3 second by use of a mixing apparatus, Turbulizer™, under condition of a temperature of the fine powders of 60° C., and a temperature of the aqueous liquid of 70° C. Granulated particles had an average particle diameter of 0.5 to 3 mm, and a water content of 55% by weight. In addition, in charging the granulated particles to the drying apparatus 10 via the pipeline 6, it was adjusted so that the granulated particle was contained in 15 to 23% by weight, relative to the polymer gel obtained in the polymerization step.

In addition, in the pulverization step, the classification step, and the granule sizing step, gas (kind: air) having a dew point of −20° C. has been passed.

Comparative Example 1

The particulate water-absorbing agent 1' was produced similarly as in Example 1, with except that the first pipeline was not jointed to any of the apparatuses and pipelines of FIG. 1. In this Comparative Example 1, collection of the fine powders by the fine powder capturing apparatus is not performed. Fine powders passed through the 150 μm metal sieve, obtained in the classification step and the granule sizing step, were charged to the granulation apparatus.

Example 2

The particulate water-absorbing agent 2 was produced similarly as in Example 1, except that 1% by mass of a 50% aqueous solution of aluminum sulfate was added, relative to the water-absorbing resin, in the cooling step.

Comparative Example 2

The particulate water-absorbing agent 2' was produced similarly as in Comparative Example 1, except that 1% by mass of a 50% aqueous solution of aluminum sulfate was added, relative to the water-absorbing resin, in the cooling step.

Example 3

According to the PD measurement method, 100.00 g of the particulate water-absorbing agent 1 obtained in Example 1, was weighed and charged in the rotating drum (1) to measure mass (Pa, Pb, Da, Db) of the filter and the glass filer paper before and after the measurement, and thereby amount of the filter dust permeation (PD) was measured. As a filter (3) in this case, the same one as the bag filter used in Example 1 was used.

Comparative Example 3

Amount of filter dust permeation (PD), through the filter, was measured by a similar method as in Example 3 by use of a nonwoven fabric (material: polyester, average pore diameter: 50 μm, thickness: 2.3 mm, trapping efficiency: 50%) as the filter (3), and the particulate water-absorbing agent 1.

Example 4

According to the PD measurement method, 100.00 g of the particulate water-absorbing agent 2 obtained in Example 2, was weighed and charged in the rotating drum (1) to measure mass (Pa, Pb, Da, Db) of the filter and the glass filer paper before and after the measurement, and thereby amount of the filter dust permeation (PD) was measured. As a filter (3) in this case, the same one as the bag filter used in Examples 1 to 3 was used.

Comparative Example 4

Amount of filter dust permeation (PD), was measured by a similar method as in Example 4 by use of a nonwoven fabric, used in Comparative Examples 1 to 3, as the filter (3), and the particulate water-absorbing agent 2.

Example 5

The particulate water-absorbing agent 3 was produced similarly as in Example 1, except that 0.3% by mass of a water-insoluble silica fine particle (product name: "Aerosil200CF", manufactured by Evonik Industries Co., Ltd., having a single particle diameter: about 12 nm, BET specific surface area: about 200 $m^2/g$, reduced weight on drying: equal to or less than 1%) was added, in the granule sizing step.

On the particulate water-absorbing agent 3 obtained, amount of filter dust permeation (PD) was measured by use of the bag filter used in Examples 1 to 3, as the filter (3), based on the PD measurement method.

Comparative Example 5

Amount of permeation dust (PD) through the filter, was measured by a similar method as in Example 5 by use of a nonwoven fabric used in Comparative Examples 1 to 3, as the filter (3), and the particulate water-absorbing agent 3.

[Performance Evaluation of the Particulate Water-Absorbing Agent]

On the particulate water-absorbing agent, amount of dust (AD), absorbency against non-pressure (CRC), absorbency against pressure (AAP) and saline flow conductivity (SFC) were measured. Measurement methods for amount of dust (AD), absorbency against non-pressure (CRC), absorbency against pressure (AAP) and saline flow conductivity (SFC) were as described above. Results thereof are shown in the following Table 1.

[Content Evaluation of the Fine Powders]

The particulate water-absorbing agent (100.00 g) was classified by use of the metal sieve with a sieve mesh size of 150 μm to measure mass ratio of the fine powders of below 150 μm, contained in this the particulate water-absorbing agent. Results thereof are shown in the following Table 1.

TABLE 1

| | | Example 1 | Comparative Example 1 | Example 2 | Comparative Example 2 |
|---|---|---|---|---|---|
| Amount of dust AD | [ppm] | 50 | 500 | 60 | 700 |
| CRC | [g/g] | 30.5 | 30.5 | 30.5 | 30.5 |
| AAP | [g/g] | 25.1 | 24.5 | 24.3 | 23.5 |
| SFC | [$\times 10^{-7}$ $cm^3 \cdot s/g$] | 32 | 22 | 53 | 40 |
| Fine powder content | [wt %] | 0.5 | 2.8 | 0.3 | 2.3 |

[Measurement of Amount of Dust Permeation]

Results of amount of permeation dust (PD) are shown in the following Table 2.

TABLE 2

| Filter | | Example 3 | Comparative Example 3 | Example 4 | Comparative Example 4 | Example 5 | Comparative Example 5 |
|---|---|---|---|---|---|---|---|
| Membrane | [ppm] | 1700 | — | 0 | — | 1800 | — |
| Nonwoven fabric | [ppm] | — | 3500 | — | 900 | — | 3700 |

As shown in Table 1, Examples have low generation amount of dust, and low amount of fine powders contained in the particulate water-absorbing agent obtained as a product, as well as superior absorbency against non-pressure (CRC), absorbency against pressure (AAP) and saline flow conductivity (SFC). From these evaluation results, superiority of the present invention is obvious.

In addition, as shown in Table 2, when Example 3 and Comparative Example 3, Example 4 and Comparative Example 4, and Example 5 and Comparative Example 5 are relatively compared respectively, Examples have lower amount of dust passing through the filter as compared with Comparative Examples. From this evaluation result, it is confirmed that, by using the membrane filter, the more fine powders can be collected and reused. In particular, in comparing Example 4, where the particulate water-absorbing agent 2 added with aluminum sulfate as the additive has used, with Comparative Example 4, significant enhancement in recovery efficiency is observed. Therefore, superiority of the present invention is obvious.

Industrial Applicability

The production method of the particulate water-absorbing agent composed principally of the water-absorbing resin relevant to the present invention, and the resultant novel particulate water-absorbing agent provide high properties (high CRC/high AAP) as well as low powder dust, and thus can be applied suitably for producing absorbent articles such as hygiene materials containing absorbing bodies such as, for example, disposable diapers or sanitary napkins, incontinent pads.

The invention claimed is:

1. A method for producing a particulate water-absorbing agent comprising:
    a polymerization step for obtaining a polymer gel;
    a drying step for drying said polymer gel to obtain a particulate water-absorbing resin;
    a classification step for sieving said particulate water-absorbing resin;
    a surface cross-linking step for cross-linking the neighborhood of the surface of the particulate water-absorbing resin obtained in the classification step to obtain a particulate water-absorbing agent;
    a packaging step for filling a packaging material container with said particulate water-absorbing agent for packaging; and
    a transportation step for transporting the products produced in each of the steps to the other steps;
    wherein fine powders contained in gas composed principally of air, in any of the steps, are collected by use of a trapping material heated to a temperature at or higher than 60° C.; said trapping material, having a trapping efficiency equal to or higher than 90% for trapping Japanese Industry Standard (JIS) 12-type carbon black with a particle diameter of 0.03 μm to 0.2 μm and being a membrane filter composed of a membrane that captures the fine powders generated from any of the steps at the surface thereof and a substrate that supports the membrane, is provided in a fine powder capturing apparatus in at least one of the steps; and the fine powder capturing apparatus is only connected via a pipeline to, but is not placed within, any of the apparatuses for performing any of the steps.

2. A method for producing a particulate water-absorbing agent comprising:
   a polymerization step for obtaining a polymer gel;
   a drying step for drying said polymer gel to obtain a particulate water-absorbing resin;
   a pulverization step for pulverizing said particulate water-absorbing resin;
   a classification step for sieving the particulate water-absorbing resin obtained in the pulverization step;
   a surface cross-linking step for cross-linking the neighborhood of the surface of the particulate water-absorbing resin obtained in the classification step to obtain a particulate water-absorbing agent;
   a packaging step for filling a packaging material container with said particulate water-absorbing agent for packaging; and
   a transportation step for transporting the products produced in each of the steps to the other steps;
wherein fine powders contained in gas composed principally of air, in any of the steps, are collected by use of a trapping material heated to a temperature at or higher than 60° C.; said trapping material, having a trapping efficiency equal to or higher than 90% for trapping JIS 12-type carbon black with a particle diameter of 0.03 μm to 0.2 μm and being a membrane filter composed of a membrane that captures the fine powders generated from any of the steps at the surface thereof and a substrate that supports the membrane, is provided in a fine powder capturing apparatus in at least one of the steps; and the fine powder capturing apparatus is only connected via a pipeline to, but is not placed within, any of the apparatuses for performing any of the steps.

3. A method for producing a particulate water-absorbing agent comprising:
   a polymerization step for obtaining a polymer gel;
   a drying step for drying said polymer gel to obtain a particulate water-absorbing resin;
   a pulverization step for pulverizing said particulate water-absorbing resin;
   a classification step for sieving the particulate water-absorbing resin obtained in the pulverization step;
   a surface cross-linking step for cross-linking the neighborhood of the surface of the particulate water-absorbing resin obtained in the classification step to obtain a particulate water-absorbing agent;
   a cooling step for cooling said particulate water-absorbing agent;
   a granule sizing step for sizing the particulate water-absorbing agent obtained in the cooling step;
   a packaging step for filling a packaging material container with the particulate water-absorbing agent obtained in the granule sizing step for packaging; and
   a transportation step for transporting the products produced in each of the steps to the other steps;
wherein fine powders contained in gas composed principally of air, in any of the steps, are collected by use of a trapping material heated to a temperature at or higher than 60° C.; said trapping material having a trapping efficiency equal to or higher than 90% for JIS 12-type carbon black with a particle diameter of 0.03 μm to 0.2 μm and being a membrane filter composed of a membrane that captures the fine powders generated from any of the steps at the surface thereof and a substrate that supports the membrane, is provided in a fine powder capturing apparatus in at least one of the steps; and the fine powder capturing apparatus is only connected via a pipeline to, but is not placed within, any of the apparatuses for performing any of the steps.

4. A method for producing a particulate water-absorbing agent comprising:
   a polymerization step for obtaining a polymer gel;
   a drying step for drying said polymer gel to obtain a particulate water-absorbing resin;
   a pulverization step for pulverizing said particulate water-absorbing resin;
   a classification step for sieving the particulate water-absorbing resin obtained in the pulverization step;
   a surface cross-linking step for cross-linking the neighborhood of the surface of the particulate water-absorbing resin obtained in the classification step to obtain a particulate water-absorbing agent;
   a granule sizing step for sizing said particulate water-absorbing agent;
   a packaging step for filling a packaging material container with the particulate water-absorbing agent obtained in the granule sizing step for packaging;
   a transportation step for transporting the products produced in each of the steps to the other steps;
   a collection step for collecting fine powders contained in gas composed principally of air, in any of the steps, by use of a trapping material heated to a temperature at or higher than 60° C.; said trapping material having a trapping efficiency equal to or higher than 90% for trapping JIS 12-type carbon black with a particle diameter of 0.03 μm to 0.2 μm, and being a membrane filter composed of a membrane that captures the fine powders generating from any of the steps at the surface thereof and a substrate that supports the membrane; and
   a granulation step for granulating the fine powders collected by use of the trapping material, the fine powders classified by the classification step, and the fine powders sized by the granule sizing step, to obtain granulated particles;
wherein said granulated particles is optionally charged to any of the steps other than the granulation step,
wherein said trapping material is provided in a fine powder capturing apparatus in at least one of the steps, and the fine powder capturing apparatus is only connected via a pipeline to, but is not placed within, any of the apparatuses for performing any of the steps.

5. The method for producing the particulate water-absorbing agent according to claim 1, wherein said membrane is made of polytetrafluoroethylene.

6. The method for producing the particulate water-absorbing agent according to claim 3, wherein said fine powders comprise those generated in the classification step and/or the pulverization step.

7. The method for producing the particulate water-absorbing agent according to claim 1, wherein the particle diameter of said fine powders is below 150 μm.

8. The method for producing the particulate water-absorbing agent according to claim 1, wherein gas having a dew point temperature of from −80° C. to −15° C. is passed in any of the steps.

9. The method for producing the particulate water-absorbing agent according to claim 1, wherein pressure is reduced to below atmospheric pressure in any of the steps.

10. The method for producing the particulate water-absorbing agent according to claim 1, wherein pressure is increased over atmospheric pressure in any of the steps.

11. The method for producing the particulate water-absorbing agent according to claim 1, wherein the particulate water-absorbing agent comprises at least one kind of a polyvalent metal salt, an inorganic particle, and a liquid permeability improver.

12. The method for producing the particulate water-absorbing agent according to claim 1, wherein the amount of the particulate water-absorbing agent supplied to the packaging step is equal to or more than 500 kg/h.

13. The method for producing the particulate water-absorbing agent according to claim 1, wherein said particulate water-absorbing resin is an irregular pulverized shaped particle of a polyacrylic acid (salt)-based water-absorbing resin.

14. The method for producing the particulate water-absorbing agent according to claim 1, wherein the polymerization step is performed by continuous kneader polymerization or continuous belt polymerization.

15. The method for producing the particulate water-absorbing agent according to claim 1, wherein the surface cross-linking step is performed using a surface cross-linking agent having dehydration esterification reactivity of one or more kinds selected from a group consisting of an oxazolidinone compound, an alkylene carbonate compound, a polyvalent alcohol compound, and an oxetane compound, at a temperature in the range of 150 to 250° C.

16. The method for producing the particulate water-absorbing agent according to claim 1, wherein the amount of dust (AD) of said particulate water-absorbing agent is equal to or lower than 300 ppm.

* * * * *